(12) United States Patent
Ashman et al.

(10) Patent No.: US 12,332,079 B2
(45) Date of Patent: Jun. 17, 2025

(54) HIGH DEFINITION (HD) MAP CONTENT REPRESENTATION AND DISTRIBUTION FOR AUTONOMOUS VEHICLES

(71) Applicant: NVIDIA Corporation, Santa Clara, CA (US)

(72) Inventors: Matthew Ashman, Bellevue, WA (US); Galen Collins, Seattle, WA (US); Russell Chreptyk, Seattle, WA (US)

(73) Assignee: NVIDIA Corporation, Santa Clara, CA (US)

( * ) Notice: Subject to any disclaimer, the term of this patent is extended or adjusted under 35 U.S.C. 154(b) by 170 days.

(21) Appl. No.: 17/670,294

(22) Filed: Feb. 11, 2022

(65) Prior Publication Data
US 2023/0258472 A1    Aug. 17, 2023

(51) Int. Cl.
  *G01C 21/00*    (2006.01)
  *B60W 60/00*    (2020.01)
  *H04L 67/146*   (2022.01)

(52) U.S. Cl.
  CPC ....... *G01C 21/3896* (2020.08); *B60W 60/001* (2020.02); *G01C 21/3815* (2020.08);
  (Continued)

(58) Field of Classification Search
  CPC ............ G01C 21/3896; G01C 21/3815; G01C 21/3881; G01C 21/3804; B60W 60/001;
  (Continued)

(56) References Cited

U.S. PATENT DOCUMENTS 10,885,698 B2    1/2021  Muthler et al.
2009/0187336 A1*  7/2009  Kawamata ......... G01C 21/3859
                                          707/E17.014
(Continued)

FOREIGN PATENT DOCUMENTS

WO   WO-2020060308 A1 *  3/2020  ............. G01C 21/30
WO       2021056380 A1    4/2021
(Continued)

OTHER PUBLICATIONS

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.
(Continued)

*Primary Examiner* — Donald J Wallace
(74) *Attorney, Agent, or Firm* — Taylor English Duma L.L.P.

(57) ABSTRACT

In various examples, a network of servers, such as a content delivery network, is used to provide a lightweight approach to hosting and serving HD map data to vehicles. The lightweight approach may allow for modifying various map components, such as tiles, layers, and/or segments. Modifying may include adding, removing, and/or updating the various components. A request to modify a first version of a High definition (HD) map may be received. Map data may be recorded that represents a second version of the HD map. A second request associated with the HD map may be received from a vehicle. Based on this second request, second map data representative of at least a portion of a layer may be identified on at least one server of the network of servers. The second map data may then be transmitted to the vehicle by the network of servers.

21 Claims, 15 Drawing Sheets

(52) U.S. Cl.
CPC ....... *H04L 67/146* (2013.01); *B60W 2556/40* (2020.02); *B60W 2556/45* (2020.02)

(58) Field of Classification Search
CPC .......... B60W 2556/40; B60W 2556/45; H04L 67/146
See application file for complete search history.

(56) References Cited

U.S. PATENT DOCUMENTS

| | | | |
|---|---|---|---|
| 2016/0275131 A1* | 9/2016 | Lublinsky | G06F 16/29 |
| 2019/0196471 A1* | 6/2019 | Vaughn | G05D 1/0214 |
| 2021/0341940 A1* | 11/2021 | Baik | G05D 1/0274 |
| 2022/0286305 A1* | 9/2022 | Tan | H04L 63/0823 |
| 2023/0358560 A1* | 11/2023 | Kanazawa | G01C 21/3889 |
| 2024/0094017 A1* | 3/2024 | Baum | G01C 21/3697 |

FOREIGN PATENT DOCUMENTS

| | | | | |
|---|---|---|---|---|
| WO | WO-2022165459 A1 * | 8/2022 | | G08G 1/01 |
| WO | 2023154199 A1 | 8/2023 | | |

OTHER PUBLICATIONS

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

"Git—git-merge Documentation", GIT, Retrieved from Internet URL : https://git-scm.com/docs/git-merge, accessed on Feb. 16, 2022, pp. 19.

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

"What is a CDN? I How do CDNs work? I Cloudflare", Cloudflare, Inc., Retrieved from Internet URL : https://www.cloudflare.com/learning/cdn/what-is-a-cdn/, accessed on Feb. 16, 2022, pp. 7.

International Search Report and Written Opinion for PCT Application No. PCT/US2023/012039, filed Jan. 31, 2023, mailed Jul. 27, 2023, 16 pgs.

Ashman, Matthew; International Preliminary Report on Patentability for PCT Application No. PCT/US2023/012039, filed Jan. 31, 2023, mailed Aug. 22, 2024, 12 pgs.

* cited by examiner

HIGH DEFINITION (HD) MAP CONTENT REPRESENTATION AND DISTRIBUTION FOR AUTONOMOUS VEHICLES

BACKGROUND

Accurate mapping and localization are vital processes for autonomous driving functionality. High definition (HD) maps, sensor perception, or a combination thereof are often used to localize a vehicle in order to make planning and control decisions. Typically, HD maps are highly accurate and often contain a substantial amount of detail not found on traditional maps to enable autonomous vehicle localization with high levels of accuracy. However, due to the amount of detail provided in an HD map, data files for conventional HD maps are often very large and may include information that is not needed and/or wanted by each autonomous driving system that uses the HD map. For example, an HD map may include data corresponding to any number of different sensor modalities and/or machine operations (e.g., planning, control, localization, etc.), and traditional systems may require downloading all of the HD map corresponding to a particular region. As such, where an autonomous machine is not equipped with LiDAR sensors, the downloaded HD map may still include LiDAR related data that may not be relevant to the autonomous machine.

Conventionally an HD map may be hosted by a tile server that stores all of the HD map data broken into geographic tiles that may be requested by vehicles. The large payloads associated with serving (e.g., hosting, managing, and distributing) the tiles of HD map data may require many copies of the tile server to be spread around the world in order to support low latencies for autonomous driving applications. When an update is performed to the HD map, not only must the update be applied to every tile server, but changes to the HD map can conflict with cached tiles of HD map data on vehicles. For example, if a vehicle is following a route on a map made up of tiles, a change to the tiles could make the route unsafe to follow using a combination of cached and newly fetched tiles. Therefore, a change to a tile of the HD map may require a disruption to autonomous driving (e.g., manual takeover) while new map data is downloaded.

SUMMARY

Embodiments of the present disclosure relate to efficient map modification and map content serving for autonomous vehicles. Systems and methods are disclosed that may modify and serve portions of map data through a distributed architecture.

In contrast to conventional systems, such as those described above, current systems and methods may use a network of servers, such as a content delivery network, to provide a lightweight approach to hosting and serving HD map data to vehicles. This lightweight approach allows for modifying various map components, such as tiles, layers, and/or segments. Modifying may include adding, removing, and/or updating the various components. In one or more embodiments, a request may be received to modify a first version of a High definition (HD) map. The first version of the HD map may have a first connected graph of a set of nodes stored on a network of servers. The set of nodes may encode layers of map content in association with geographical locations. Based on the request, first map data may be recorded that represents a second version of the HD map, with a second connected graph of the set of nodes stored on the network of servers. The second connected graph may correspond or otherwise be associated with the first connected graph modified according to the request. A request associated with the HD map may then be received from a vehicle and based on this request, second map data representative of at least a portion of a layer may be identified on at least one server of the network of servers. The second map data may then be transmitted to the vehicle by the network of servers.

BRIEF DESCRIPTION OF THE DRAWINGS

The present systems and methods for efficient map representation and map content serving for autonomous vehicles are described in detail below with reference to the attached drawing figures, wherein.

DETAILED DESCRIPTION

Figure 1A:
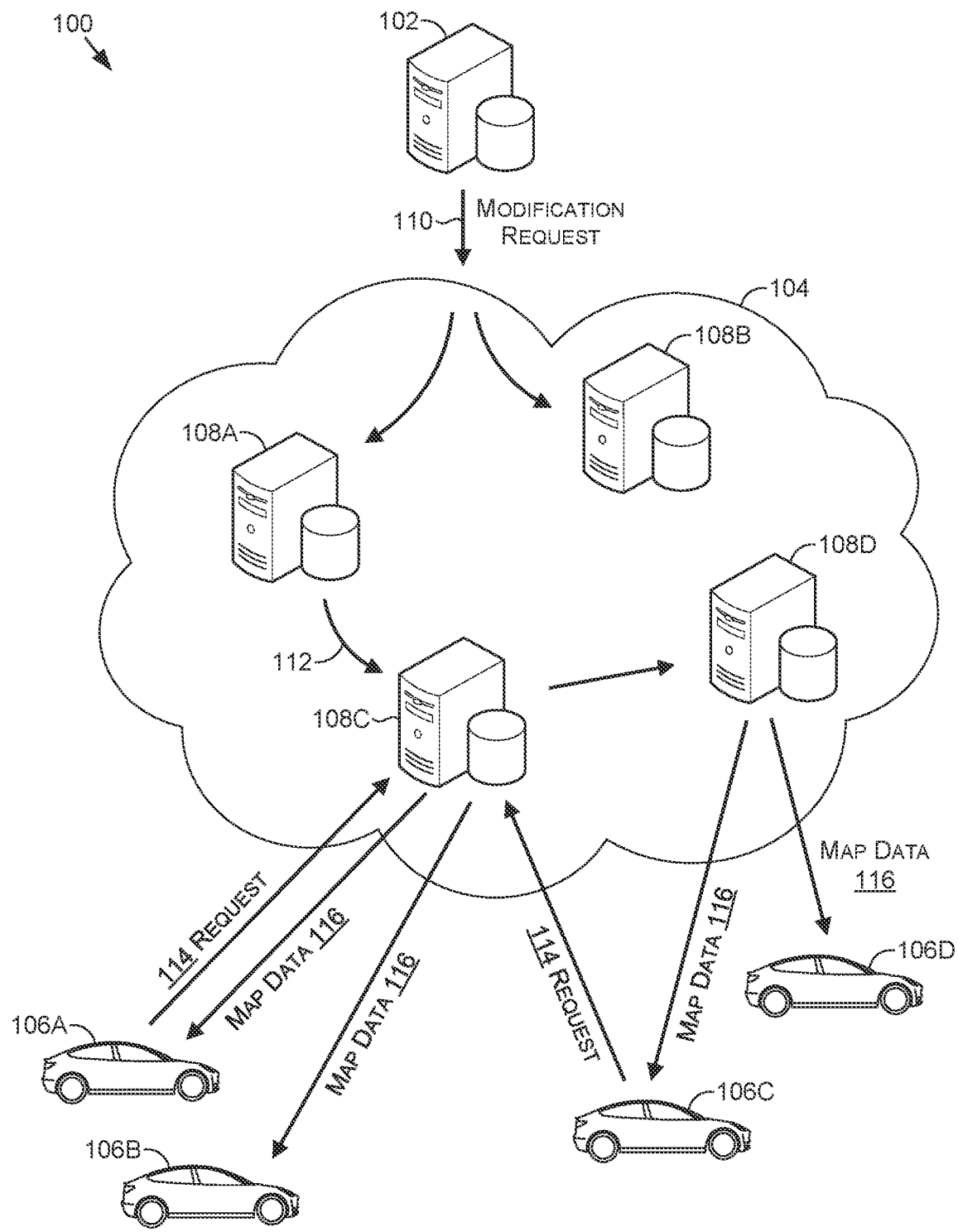
FIG. 1A is a diagram showing an example of a map data system, in accordance with some embodiments of the present disclosure.

Systems and methods are disclosed related to efficient map representation and map content serving for autonomous vehicles. Although the present disclosure may be described with respect to an example autonomous vehicle 800 (alternatively referred to herein as "vehicle 800" or "ego-vehicle 800," an example of which is described with respect to FIGS. 8A-8D), this is not intended to be limiting. For example, the systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to the updating and serving of map data to autonomous vehicles, this is not intended to be limiting, and the systems and methods described herein may be used in augmented reality, virtual reality, mixed reality, robotics, security and surveillance, autonomous or semi-autonomous machine applications, traditional non-autonomous machine applications, and/or any other technology spaces where map data may be used.

In one or more embodiments, the tiles of an HD map may form a large collection of various types of map data related to a geographic area. The tiles may include more data than is needed by any single process, operation, task, or system associated with a vehicle, and may be structured such that the entirety of the tile need not be requested or sent. For example, particular layers and/or segments of the tile may be needed, based upon the vehicle type, the sensor type, the level of automation, and other considerations. In one or more embodiments, a tile may include multiple images from various angles, various overlays, point clouds of LiDAR data, point clouds of radar data, images of the point clouds, one or more road graphs, depictions of lanes on top of the road graphs, road signs, and/or other information. One or more types of this data may be incorporated into a layer. Layers of a tile may accommodate different types of vehicles that may have different sensors. For example, vehicles with a LiDAR sensor may receive and implement a LiDAR layer that includes LiDAR localization data to assist one or more processing systems of the vehicle in interpreting and locating itself within the geographic area. As another example, vehicles with a camera may receive and implement a camera layer with images of the ground to assist the computer in interpreting and locating itself within the geographic area. Non-limiting examples of information that may be included in layers are lane boundary information, lane marking information, traffic sign information, RADAR localization information, LiDAR localization information, and road segment information.

Segments of map data may correspond to a smaller geographic region within the geographic area of the tile and include data for a layer in that smaller geographic region. For example, a straight road represented in a tile may be formed using segments of the road in a chain formation. The HD map may have map data regarding each segment in a local coordinate frame. The segment may have an identifier to reference the smaller geographic region or location(s) of the segment in the local coordinate frame within the larger geographic area of the tile (e.g., a client may request a segment via the identifier). The identifier may be a uniform resource identifier (URI), such as a uniform resource locator (URL) or uniform resource name (URN). Segments may thus contain easily transmittable data that defines the spatial structure of elements of the HD map. One or more layers of a tile may each have segments corresponding to the same smaller geographic region. Thus, various types of map data may be provided for each smaller geographic area, through respective segments associated with that smaller geographic area. A segment graph may be used to define dependencies between segments and/or layers.

One or more HD maps (or components thereof) may be stored on a network of servers, such as a content delivery network (CDN) or other data stores (e.g., S3 web services). The network of servers may allow for the HD map data to be distributed across the network without requiring each server to store all of the HD map data of an HD map while maintaining high availability of the data to support low latency transfers to clients. When an update is performed to the HD map, the update need not be applied to every server. In at least one embodiment, a CDN may serve map data to an endpoint (such as a computer associated with a vehicle) via any of the numerous servers. The computer associated with the vehicle may request map-related content from one or more servers of the CDN, which may draw the map data from a cache(s) of one or more edge servers, if available, and otherwise draw the data from one or more origin servers. The network of servers may additionally or alternatively push map data to one or more vehicles via the server(s) of the network. The network of servers may provide scalability and reduced serving time and be more storage efficient than conventional approaches to serving map content.

To modify an HD map, one or more servers may receive a request to modify a first version of the HD map. The first version may be any version currently stored on the one or more servers. The first version of the HD map may be defined by a first connected graph of a set of nodes stored on a network of servers, such as a CDN. The set of nodes may encode, contain, or otherwise be associated with layers of map content in association with geographical locations. The one or more servers may record a first set of data that represents a second version of the HD map in response to the request. The first set of data may be at least partially defined by a second connected graph of the set of nodes, with the second connected graph corresponding to the first connected graph modified according to the request. In at least one embodiment, a version of a map may include a list of pointers and/or references to one or more nodes stored on the network of servers. In one or more embodiments, the first connected graph and the second connected graph may be immutable on the network of servers. Thus, updates to a map need not invalidate cached map data on vehicles and older or different versions of a map may be used by different vehicles.

Examples of nodes that may be included in a connected graph may include nodes representing a layer, a segment, a tile, or a map version. For example, a node may represent a first layer grouping a first set of segments of the map content in association with a geographical region. Another node may represent a second layer grouping a second set of segments of the map content in association with the geographical region. The modification to the HD map may include an addition, deletion, replacement, and/or supplementation of one or more segments, layers, and/or tiles of map data. The one or more servers may also record the modification. Recording the modification may include adding an entry to a changelog or a journal, creating a snapshot of the changelog, storing one or more new nodes on the network of servers, and/or applying or associating other metadata with the graph. The changelog or journal may be used to implement a version control system (VCS) that keeps track of the various versions of maps over time that may allow previous versions to be accessed and served.

One or more servers may receive any of various requests from a computer system associated with a vehicle. For example, the computer system of the vehicle may select and request specific layers and segments of an HD map based upon sensors, level of automation, or other needs. To fulfil the request, the one or more servers may identify a set of map data on at least one server of the network of servers. The set of map data may be representative of at least a portion of a layer of the layers of map content. The set of map data may then be transmitted by or through the network of servers to the vehicle. The vehicle may maintain the map data in a cache such that normal operations can continue in the event of intermittent disconnection from the network and/or suspension and resumption of autonomous driving. The caching may be configured to allow the cached map data to be used without requiring a full download of a tile or layer based upon updates to a corresponding map, as the vehicle may operate on an older version of the map and request map data for that map.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

With reference to FIG. 1A, FIG. 1A is a diagram showing an example of a map data system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 800 of FIGS. 8A-8D, example computing device 900 of FIG. 9, and/or example data center 1000 of FIG. 10.

At a high level, the map data system 100 may include a map server 102, a system of servers 104, and one or more vehicles 106A-D (generically, vehicles 106). In some embodiments, the map data system 100 includes the network of servers 104 which may interact with the vehicles 106 such as by supplying and modifying map data for use in controlling the vehicles 106. Generally, the map data system 100 may modify map data and serve various versions of map data to vehicles and/or other client devices. In some embodiments of the present disclosure, the vehicles 106 are external to and communicate with the map data system 100. In one or more embodiments, one or more of the vehicles 106 may include a distributed server 108 and/or may store and server a portion of HD map data (e.g., in a peer-to-peer and/or hybrid network arrangement).

The map server 102 may be a component of the network of servers 104 or may be distinct from the network of servers 104. The map server 102 may receive input directly or indirectly regarding new or modified map data. The map data may be directly modified on the map server 102, imported from a user device such as from a map administrator, imported from a third-party mapping service.

The network of servers 104 may include one or more distributed servers 108A-D (generically, distributed servers 108). The distributed servers 108 of the network of servers 104 may be spread over a wide geographic area. In this way, the vehicles 106 spread over a similar geographic areas may have more local access. Local access may allow for higher availability and transfer speeds, and may reduce bottlenecking. Map data may be stored on one or more distributed servers 108 of the network of servers 104. In some embodiments of the present disclosure, the network of servers 104 is or includes a content delivery network ("CDN"). The CDN may be distinct from a single server distribution, in which messages are sent to and from a central server. The CDN may allow any of the distributed servers 108 to serve content to a vehicle 106.

To modify an HD map, a modification request 110 may be sent from the map server 102, one or more of the vehicles 106, and/or a client device (e.g., a laptop, a personal computer, a device providing access to an administrator account authorized to modify the HD map and/or a version thereof, etc.). As shown in the example of FIG. 1A, the modification request 110 may be sent to a first distributed server 108A and a second distributed server 108B. The first distributed server 108A may send an inter-server modification request 112 to a third distributed server 108C so as to perpetuate the modification request 110 through the network of servers 104. The third distributed server 108C may send a further inter-server modification request 112 to a fourth distributed server 108D. As such, the inter-server modification request 112 may travel throughout the network of servers 104, such that an updated version of the HD map (as discussed herein) may be recorded at (e.g., stored within or otherwise accessible by) one or more of the distributed servers 108. In one or more embodiments, the updated version of the HD map may comprise a snapshot and/or map manifest, which points to underlying HD map data. The underlying updated HD map data map be stored at any of the various distributed servers 108 and/or an origin server thereof.

The vehicles 106A-D (generically, vehicles 106, such as the autonomous vehicle 800) may each include or otherwise be associated with one or more computer systems. The computer systems of the vehicles 106 may utilize map data in any of various ways. The computer system may utilize map data to navigate on a large scale (e.g., to navigate between two locations), to navigate on a small scale (e.g., to remain in a certain lane, take a certain exit, etc.), to self-locate itself relative to the map, to plan future routes, or to perform other tasks.

The computer system of the vehicle 106 may send and/or receive various messages with respect to the network of servers 104. For example, a vehicle 106 may send a request 114 to a local distributed server 108 and receive as a response a map data message 116 including any of the various types of map data described herein (e.g., a layer, a segment, a node, a tile, etc. requested using a corresponding URL). In the example of FIG. 1A, the vehicle 106A sends a request 114 to local distributed server 108C. The local distributed server 108C will process the request 114 and provide a map data message 116 to the vehicle 106A in response to that particular request. The request 114 may be for additional map data for a new geographic region, for additional layers (discussed herein) of map data, updates to existing map data, for a particular version of map data, etc. In the example of FIG. 1A, the distributed server 108C may push a map data message 116 to vehicle 106B without any prior request from the vehicle 106B. In the example of FIG. 1A, the vehicle 106C may send a request 114 to a first distributed server 108C and receive a map data message 116 from a second distributed server 108D. The change in distributed servers may be due to movement of the vehicle 106C, the location of the map data to be served, the location of the vehicle 106C, or other considerations. In one or more embodiments, based on the second distributed server 108C being closest or most local to the vehicle 106C, and the requested map data not being cached at the second distributed server 108C, the distributed server 108C may fetch or otherwise access the map data from another distributed server 108D, serve the map data to the vehicle 106C, then cache that data for future requests from vehicles 106. A map data message 116 may also be sent by a distributed server 108D to vehicles, such as vehicle 106D, in response to requests from other vehicles, such as vehicle 106C, and/or to other servers, such as distributed server 108C.

Figure 1B:
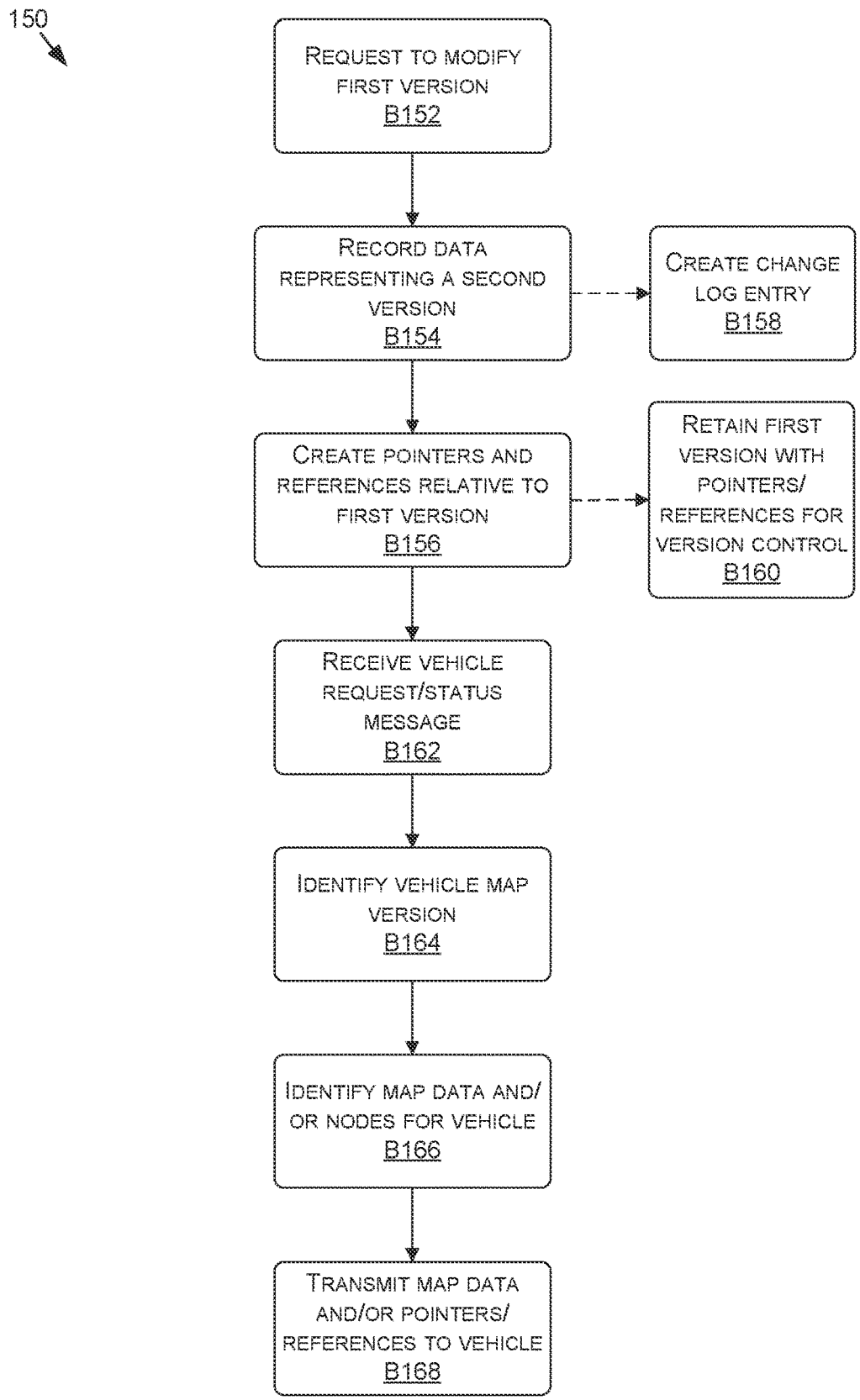
FIG. 1B is a flow diagram illustrating an example method of modifying and serving HD map data, in accordance with some embodiments of the present disclosure.

Now referring to FIG. 1B, FIG. 1B is a flow diagram illustrating an example method 150 of modifying and serving HD map data, in accordance with some embodiments of the present disclosure. Each block of the method 150 and other methods, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the method 150 is described, by way of example, with respect to the map data system 100 of FIG. 1A. However, these methods may additionally or alternatively be executed by any one system, or any combination of systems, including, but not limited to, those described herein.

The method 150, at block B152, includes receiving a request to modify a first version of an HD map. The request may be received by a server from another server within the network of servers, from an administrator or developer computing device, from a map database external to the system 100, or from some other source. The HD map may include various map data arranged such that a portion of the map data may be updated without deleting or changing the existing version of the map data, as discussed herein.

Before further discussing how the map data may be updated, the map data itself will be discussed in further detail. An HD map may be defined by a connected graph of a set of nodes. The connected graph may be immutable. The set of nodes may be stored on or across the network of servers 104. The set of nodes may contain, encode, or otherwise be associated with layers of map content in association with geographical locations. Generally, the map data may be associated with a set of nodes that form one or more connected graphs of one or more HD maps (e.g., each comprising a respective set of the nodes). A first node of the set of nodes may represent a first layer, grouping a first set of segments of the map content in association with a geographical region. A second node of the set of nodes may represent a second layer grouping a second set of segments of the map content in association with the geographical region. However, other examples of nodes include segments, tiles, etc.

Figure 2A:
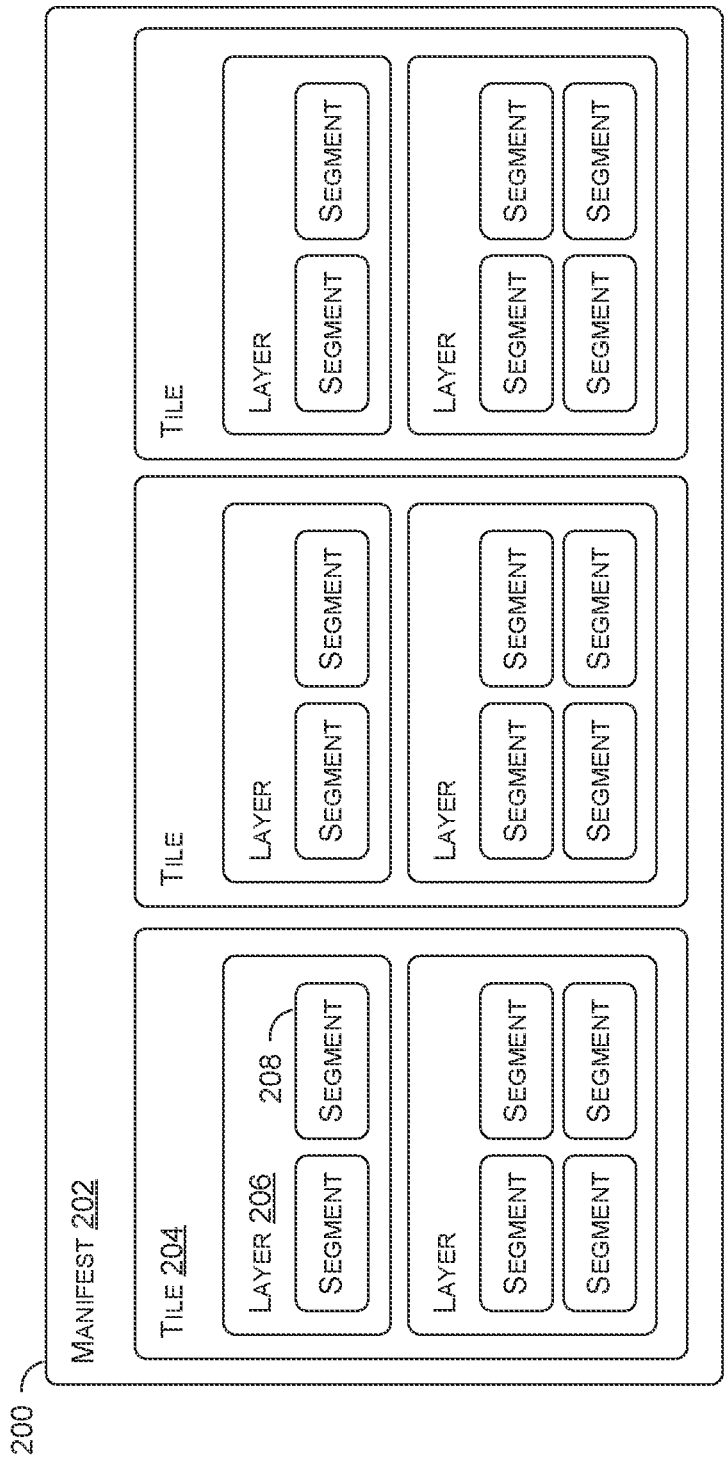
FIG. 2A is a diagram showing examples of various components of an HD map, in accordance with some embodiments of the present disclosure.

FIG. 2A is a diagram showing examples of various components of an HD map 200, in accordance with some embodiments of the present disclosure. The HD map 200 may be in any of various data formats for storing map data, such as in an NVIDIA Map (NVMap) data format. As shown in FIG. 2A, a map manifest 202 may provide a high-level container for the HD map 200. In some embodiments, the HD map 200 may be identified by a universally unique identifier (UUID). In some embodiments, at least some map data in the HD map 200 may be immutable and never change. For example, later versions or updates to the HD map and/or map components may be published with a new UUID, which may incorporate changed portions of the HD map and represent a new version of the HD map.

While the map manifest 202 is shown as including various components, the map manifest 202 may be represented as a data structure, data object, and/or file that includes references to the components of the map manifest 202 and may indicate the hierarchical relationship shown between those components. For example, each reference may include a corresponding URL, URI, and/or UUID, etc. that a client may use to request a corresponding component(s). In some embodiments, a map manifest may be stored in a file format—such as a JSON file—that describes a tile layout and layer layout of a map. The manifest may operate as a container for data payloads and may not prescribe any detail of a layer's payload format. The format for layers may be described in a 'Layer Format' section of the manifest. In one or more embodiments, the manifest may contain a JSON object.

In some embodiments, the manifest file may contain a UUID for a map ('id') and a list of tiles ('tiles'). Each of the tiles of the list of tiles may contain a UUID for the tile ('id'), a quadrilateral for a geographic region the tile represents ('region'), a list of layers within the tile ('layers'), and/or other necessary data for the tiles. One or more layers in the layer list may contain a unique name of the layer(s) ('name'), a 'Link' object that may describe a URL for the layer payload. In some embodiments, the layer payload may be raw layer data, for example, an XML file for a legacy XML layer and/or a layer manifest when layer contains multiple payloads. In some embodiments, the layer manifest file may contain a UUID of the tile that contains it ('tile_id'), a unique name of the layer ('name'), a list of payload items ('items'), and/or other necessary data for the layer manifest. The payload items may contain a name for the payload ('name'), a link object that may describe where to download the payload ('link'), metadata regarding the payload ('meta'), and/or other payload information.

The map manifest 202 may define one or more tiles 204 of the HD map 200. A tile 204 may represent a container for a portion of map data that corresponds to a geographic region (e.g., one square kilometer) of the HD map 200 and may contain one or more layers 206. The one or more tiles 204 may be designed to be downloaded as a unit, or may be designed such that various elements of map data within the tile 204 (e.g., individual layers 206 or segments 208 thereof) may be downloaded and/or modified independently. For example, a segment 208 within a tile may represent a portion of a roadway (e.g., 50 meters), and each tile 204 may include a plurality of layers 206 defined therein—e.g., each of the road segments may be associated with a layer 206 and may be included within the tile 204. By storing the map data in tiles 204, and then as layers 206 and segments 208 within the tiles 204, map data may be more easily searchable. For example, instead of searching an entire map manifest 202, a listing of tile 204 locations may be used to determine a tile 204 corresponding to a current location of the vehicle, and then a listing of available layers 206 within the tile may be used to determine which map data correspond to the current location of the vehicle. As a result, this tiered structure for the HD map 200 may allow for easier access and serving to the desired portions of the HD map 200 for use by the vehicle 106.

A tile 204 may include one or more layers 206. A layer 206 may correspond to a class of data on the HD map 200. Layers 206 may be designed to be selectively downloaded so that a client may only download the data that it or the server(s) deems relevant. Layer data stored in the tile 204 may include a corresponding layer 206 for each layer type that the HD map represents. Example layers may include a camera localization layer, a RADAR localization layer, a lane graph layer, a lane channel layer, a junctions layer, etc. In addition, by segmenting the map by tiles 204 and then layers 206 and segments 208, the HD map 200 may be updated, downloaded, and/or used (e.g., for driving, training of perception systems, etc.) at a more granular level, without requiring downloads, updates, or use of portions or segments of the HD map 200 that are not relevant, supported, or needed for a given task. In various embodiments, a map manifest 202 may include any combination of these components and any suitable organization. In one or more embodiments, segments may be included without layers and/or tiles.

Figure 2B:
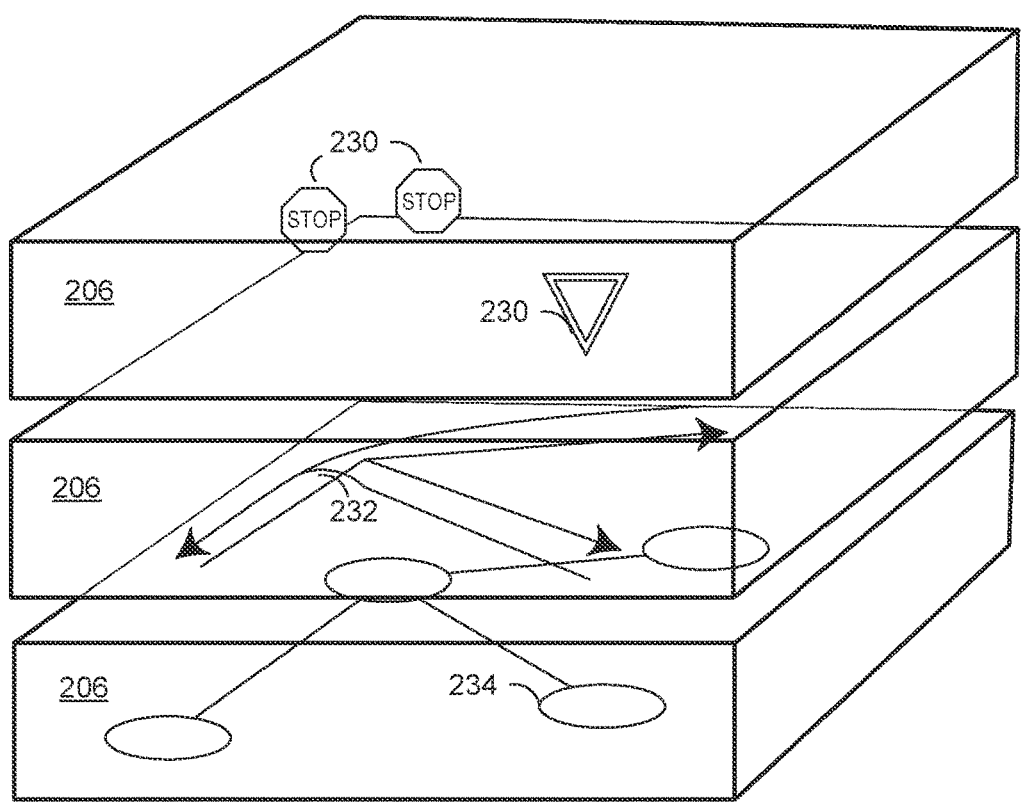
FIG. 2B is a diagram showing example layers of a tile of map data, in accordance with some embodiments of the present disclosure.

FIG. 2B is a diagram showing example layers 206 of a tile of map data, in accordance with some embodiments of the present disclosure. As described herein, a map layer 206 may represent or correspond to a class of data on the map. A first layer 206 may include a first type of map data 230, such as street signs. A second layer 206 may include a second type of map data 232 such as lanes. A third layer 206 may include a third type of map data 234 such as a reference frame for segments. Examples of layers 206 of map content may include one or more of: lane boundary information; lane marking information; traffic sign information; RADAR information; LiDAR information; or road segment information. These map layers 206 may be selectively downloaded to allow a client to only download relevant data to the ego-machine. In one or more embodiments, a tile may be made up of a core layer 206 and one more map feature layers 206. A core layer may refer to a layer that is sent to all clients that are accessing a tile (e.g., without specifically requesting the layer) and may define a graph structure of the map—such as a graph of road lanes. However, in other embodiments core layers may not be included for a tile. A map feature layer(s) may include features such as traffic signs, junctions, training layers (e.g., for generating ground truth data for training machine learning models, deep neural networks (DNNs), and/or the like), and other types of feature layers. Individual map feature layers may be optionally/selectively downloaded by the client as needed. For example, a user may optionally download a 'traffic_signs' layer in order to gain access to signs in the world. In some embodiments, layers 206 may also be used to augment existing data, such as a junctions layer which may include rules for navigating intersections. Advantageously, the level of detail and/or granularity of the HD map may be scaled up or down based on the needs of the system.

Various nodes of map data may include any of various tiles, layers, and/or segments of map data. For example, a first node of the set of nodes in the map data may represent a first layer of a first type of sensor data in association with a geographical region and a second node of the set of nodes may represent a second layer of a second type of sensor data in association with the same geographical region.

In some embodiments, layers may be identified by a unique string layer name. For example, layer names may identify the layer with names such as 'core', 'junctions' and/or 'images_radar_detections'. Accordingly, references to a layer may be made by the layer's unique layer name.

In some embodiments, a data compatibility contract may be defined per layer name such that a payload for each layer may be designed to be backwards and forwards compatible. If a data format must change that will break backwards and forward compatibility, a new layer with a new layer name may be defined. For example, if a new format is required for the data inside a 'traffic_signs' layer that would be incompatible with existing clients of the 'traffic_signs' layer, a new layer may be created instead (e.g. 'traffic_signs2'). In further embodiments, optional additional data may be added to one or more layers provided it is not required for legacy consumers to read the data.

In some embodiments, layers may have layer dependencies. A layer that has a dependency may not be understood by the system unless one or more required dependent layers are also present and/or provided to the system. For example, each layer may depend on the 'core' layer and require that the 'core' layer be provided to the system in order to use any additional layers. In some embodiments, layer dependencies may be configured into a dependency graph where layers may reference sub-layers that may be required in order to use a particular layer. If a particular layer is selected, the system may determine which sub-layers are needed and provide each of the needed sub-layers, along with the selected layer, to the ego-machine to enable the ego-machine to understand the data of the selected layer. For example, if the junctions layer is selected, the system may determine that a lanes layer is required to describe the geometry of the roadway in order to apply roadway rules from the junctions layer.

The manifest may not prescribe the content of layer payloads. Instead, a data contract for the payload may be defined per layer name. In a non-limiting embodiment, there may be four format archetypes that layers follow for their data contract. New archetypes may be added for new layers. In some embodiments, a 'Flatbuffer Layer' may be the preferred archetype for all new layers. This layer format may rely on Flatbuffers for data serialization. A Flatbuffer Layer may include a layer manifest as described herein, and each payload of a Flatbuffer Layer may be configured as a Flatbuffer message. The Flatbuffer messages may be defined in, for example, avprotos nvmap. In further embodiments, layer content may be stored in Flatbuffer messages for each core road segment. Additionally, the name of the payload may be the unique UUID of the road segment. Common data types may be available for use within the Flatbuffer layers. In some embodiments, data elements in a map may be referenced by a UUID.

Figure 2C:
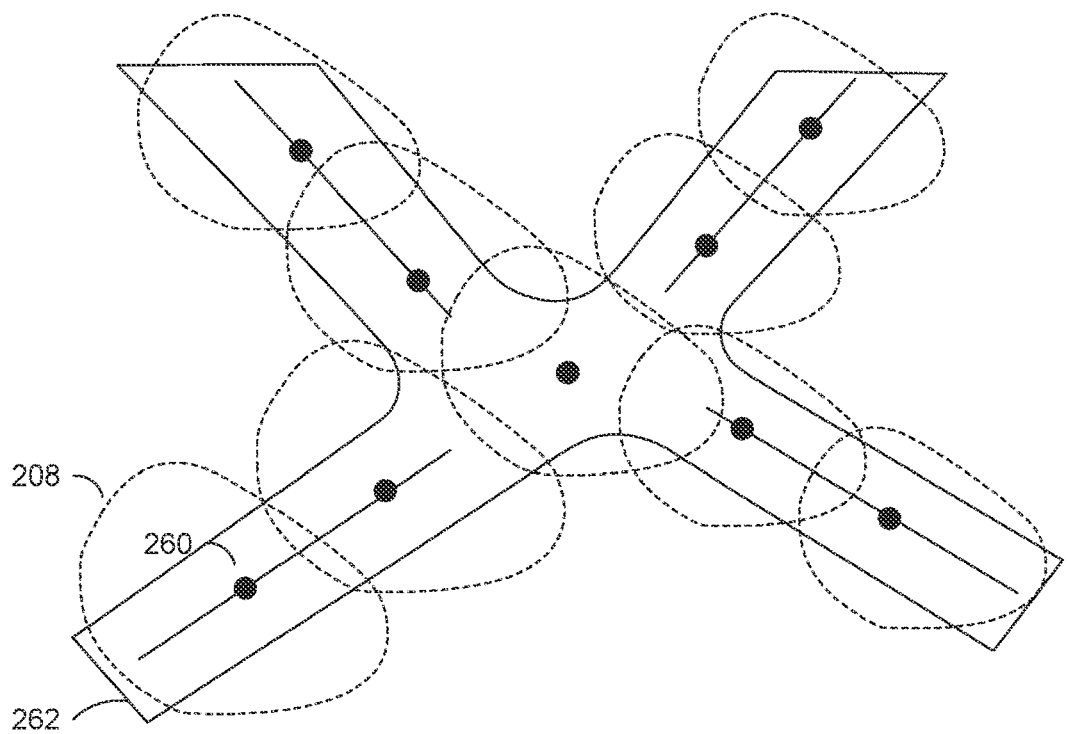
FIG. 2C is a diagram showing example segments of a layer of map data within a layer, in accordance with some embodiments of the present disclosure.

FIG. 2C is a diagram showing example segments 208 of a layer of map data within a layer, in accordance with some embodiments of the present disclosure. For example, in FIG. 2C, a segment 208 having a coordinate system based on a local origin 260 is illustrated relative to other map data 262. The transformations between segments 208 may include transformation between origins of adjacent segments. In the examples of FIG. 2C, the segments 208 are road segments representing portions of road. In some embodiments, road segments may have a maximum size (e.g., 1 km) such that each point is within a relatively close distance (e.g., 500 m) to a road segment origin. In some embodiments, road segments may be connected to nearby segments—e.g., any two road segments that a vehicle can travel between may be connected. While road segments are described, a segment may represent any suitable type of data (e.g., associated with one or more geographic coordinates).

In some embodiments, a layer may refer to elements of another layer. For example, a traffic light on the 'traffic_lights' layer may be associated with a lane on the 'core' layer. As used herein, a layer whose data is being referenced may be called the target layer. A layer that contains the reference to the target layer may be called a source layer. A 'MapElementId' may be used to refer to an entity when the target layer does not change. The target layer may be documented in the message comments so that a decoding implementation knows which layer to search to find the data.

In some embodiments, the disk representation may include each per road segment protobuf/flatbuffers payload being stored in a map directory (e.g., map_directory/[layer name]/[road segment id]). For example, the use of flatbuffers may allow for each layer corresponding to each road segment to be downloaded individually and directly to the ego-machine without deserialization or parsing. As opposed to conventional HD maps where large map files are downloaded, deserialized, and parsed in order to generate map data in a digestible format for the ego-machine, the HD map of the present disclosure may include individual flatbuffer payloads for each layer within each road segment identified using UUIDs, for example. As such, when downloading the desired layer(s) for a given (e.g., current) road segment, the ego-machine may request the data corresponding to the layer within the road segment and receive the flatbuffer payload that may be used directly without deserialization, parsing, and/or the like. For example, the entire payload from the flatbuffer may be downloaded directly to memory—e.g., into a cache—and then discarded once the road segment has been traversed. In some examples, the cache may store data for a current road segment and one or more surrounding road segments, and may discard road segment data once the road segment has been traversed, or is not going to be traversed.

Figure 3:
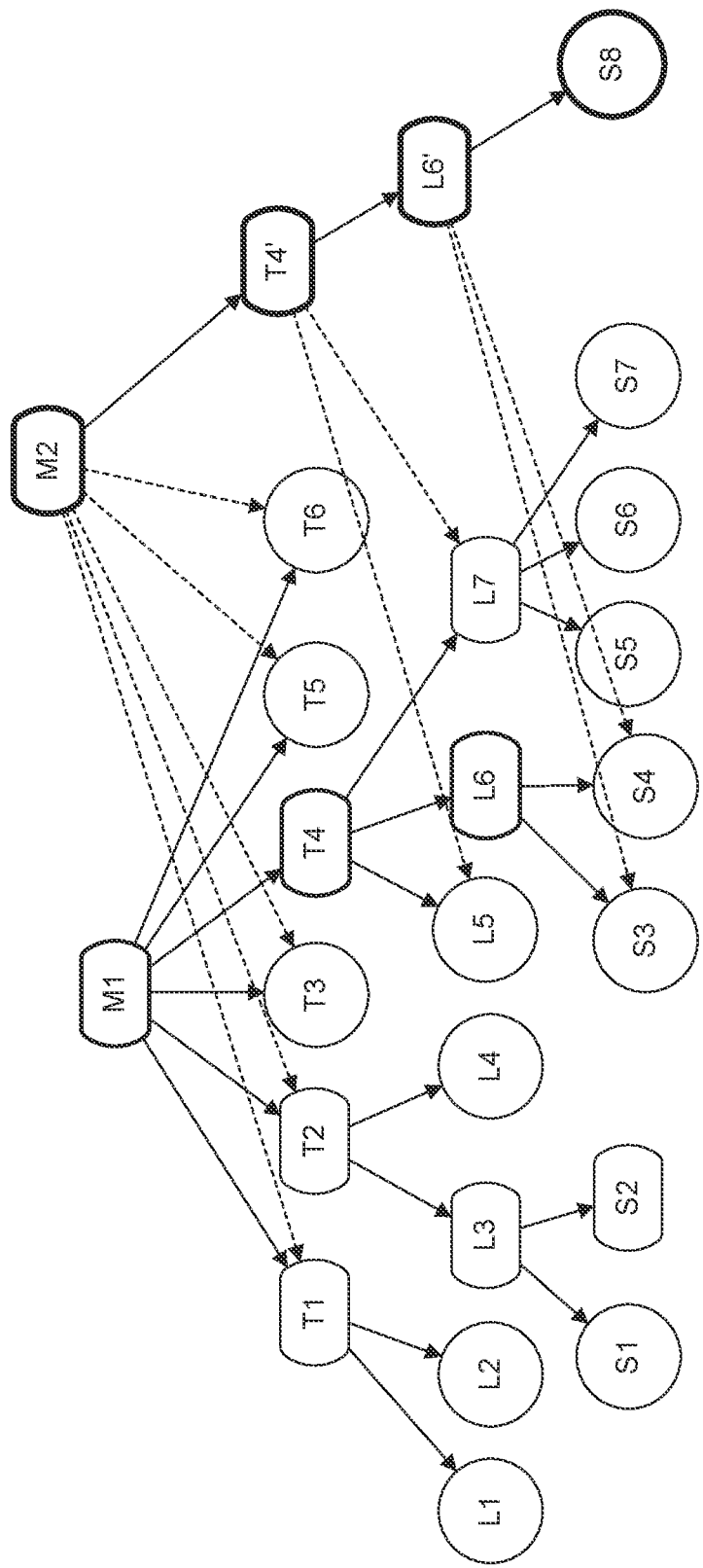
FIG. 3 is a diagram showing an example of a first version of an HD map and a second version of the HD map formed as connected graphs of nodes, in accordance with some embodiments of the present disclosure.

Returning to FIG. 1B the method 150, at block B154, includes recording data representing a second version of the HD map. FIG. 3 is a diagram showing an example of the first version of the HD map and the second version of the HD map formed as connected graphs of nodes. The first version of the HD map is generally shown toward a left side of FIG. 3, and the second version of the HD map is generally shown on a right side of FIG. 3. In particular, the first version of the HD map is shown under the map version one (M1) heading, which may be a root node of the first version of the map. M1 includes six nodes of tiles, T1-T6. Each tile may include one or more nodes of layers L1-L7. It should be appreciated that, as with the number of tiles, more or fewer numbers of layers may be included in a version of an HD map. Layers may include one or more nodes of segments, S1-S7, of map data.

The second version of the HD map is similarly shown under the map version two (M2) heading, which may be a root node of the second version of the map. The second version may be a modification of and may be built upon or based off of the first version according to the request. In embodiments of the present disclosure, the second version may be recorded while retaining the first version. Retention of the versions allows for version control, as discussed herein, as well as light-weight updating of the map. For example, the map may be updated by providing or sending only the updated portions that reference existing portions of map data without requiring sending of the entire tile (or other portion of map data).

As indicated in FIG. 1B, recording data representing a second version of the HD map at block B154 may, in one or more embodiments, include creating one or more changelog entries at block B158. A changelog entry may be indicative of the additions and/or modifications that were made to the map data between two or more versions of the map data. Recording the map data may include creating one or more entries in a changelog. The one or more entries created may define the second version of the map by sequences of changes to the first version of the map, such as indicated in FIG. 3, which itself may be defined as a sequence of changes to another version of the map. The map data to be sent, as discussed herein, may be identified from a snapshot of the changelog (e.g., representing one or more particular versions of one or more maps) which may be generated at any suitable time so that the change long need not be traversed in response to a request. As described herein, the changelog may be indicative of what, if any, new nodes and/or pointers are needed to modify a first version of the HD map (e.g., map version one M1 of FIG. 3, such as stored on a vehicle 106) into the second version of the HD map (e.g., map version two M2 of FIG. 3).

The method 150, at block B156, includes creating pointers and/or references relative to the first version. Generating and/or recording the second version of the HD map may include generating the second map version (M2) heading or node shown in FIG. 3. The second map version M2 includes a new segment S8 that may also be generated based on the request. The new segment S8 may add to and/or modify information in the first map version M1. The second map version M2 may also include L6', a modified version of the layer L6, and T4, a modified version of the tile T4. The modified layer L6' may include a reference(s) or pointer(s) to existing segments of map data S3 and S4, as shown in FIG. 3 by dashed arrows. In this way, the original map data of segments S3 and S4 used in the first map version M1 are retained in the second map version M2. The new modified layer L6' includes original segments S3, S4, and new segments S8. Similarly, the modified tile T4' includes references to L5 and L7, as did the original T4. It should be appreciated that the above are examples, and that various embodiments of the present disclosure may modify or add any number of nodes or other map data. As described herein, the underlying data of the nodes in FIG. 3 may be stored across the network of servers 104. Further, any of the various nodes may be included in multiple HD maps, in addition to or instead of multiple versions of the same HD map.

As described herein, the various nodes (e.g., tiles, layers, and/or segments) may be identified by a uniform resource identifier (URI), such as a URL. The URI may correspond one or more nodes, such as any of those appearing on FIG. 3 or any combination thereof. The network of servers 104 may retrieve the map data for the map version two M2 using the URI to identify one or more corresponding node(s) and/or pointer(s) to fulfill the request. Creating pointers may include adding a new URI that corresponds with at least one new node added to the connected graph and recording the map data on the network of servers 104 in association with the URI and/or node.

Figure 4:
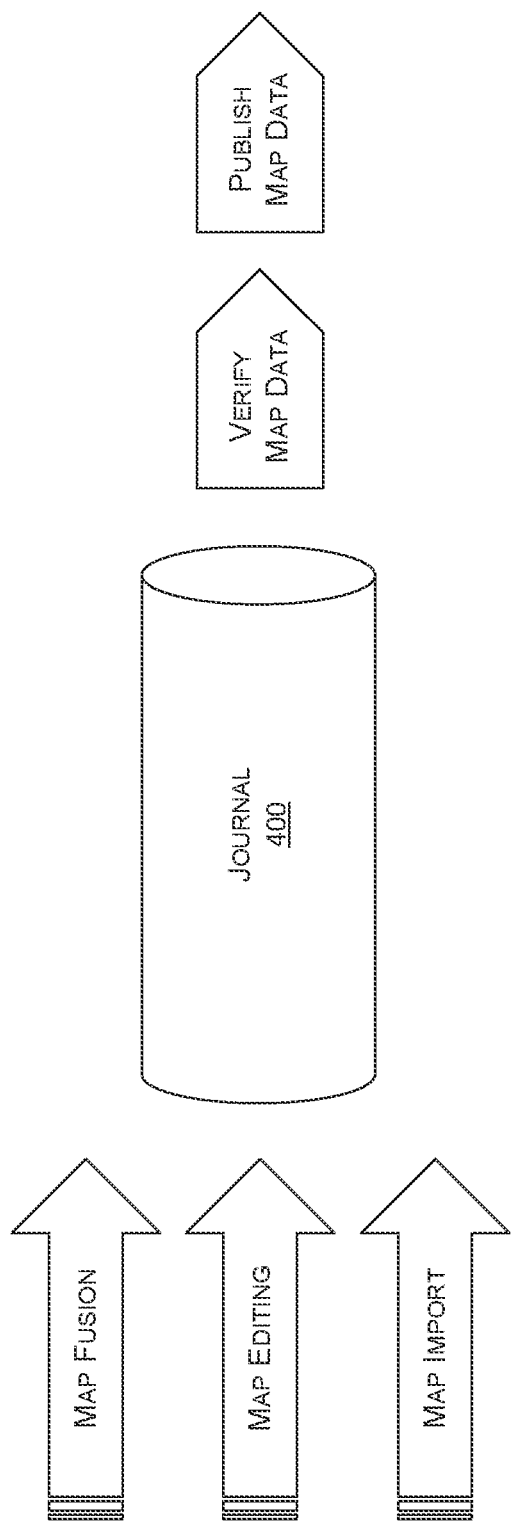
FIG. 4 is a diagram showing how a journal may be used for version control, in accordance with some embodiments of the present disclosure.

FIG. 4 is a diagram showing how a journal 400 may be used for version control, in accordance with some embodiments of the present disclosure. The journal may provide various functionality in relation to storage and management of one or more HD maps. A first example from FIG. 4 is map fusion, which may include combining two or more HD maps (or portions thereof). A second example from FIG. 4 is map editing, which may include an administrator user or account editing map data (such as manually through an editing program or automatically) so as to update or correct existing map data (e.g., resulting in the modification request 110). A third example from FIG. 4 is map import, which may include receiving or otherwise acquiring map data from an external source, such as a third-party mapping service. This functionality may be effectuated based at least on recording various map data using one or more changelog entries in the journal with version control. The map data may then be verified, such as to confirm compatibility between the various map versions. After verification, the map data may be published (e.g., as a snapshot), such as by sending the map data to one or more distributed servers 108 of the network of servers 104 for handling requests.

The map data in the journal may be used to create different snapshots of the journal at different time intervals. For example, after an edit a segment database may be updated, various metrics may be updated once per day, and a new version of the HD map may be sent to the network of servers 104 once per week. Editing may apply to a current state (from a database or snapshot and the latest log entries) and can keep a journal list of edits. The journal may then be updated on a merge. Two or more lists of edits and modifications to map data may be merged and verified. The journal entries may form a collection of operations interacting at the segment (e.g., road segment) level. Requested modifications to the map data may be converted to these operations. Journal entries may be stored and have links stored in the command to prevent the excessive growth of the journal. An example collection of operations includes operations corresponding to actions to Change, Create, Delete, Update, or Connect one or more segments or data elements from a segment. In one or more embodiments, the segment may be identified or otherwise defined by any of a segment identifier, a starting and ending segment identifier, a hash, a chain hash, one or more layers, timestamp data, or other metadata.

As indicated in FIG. 1B, creating pointers and/or references relative to the first version at block B156 may, in one or more embodiments, include retaining the first version with the pointers and/or references for version control at block B160. Various branches of map data may be created as a list of edits and an associated identifier. Generally, a collection of edits may be submitted and validated, which may include manual editing of the map. The changes may then be committed and stored along with a snapshot of the map version. The network of servers 104 may then be updated with the new map data. In this way, changes to the map may be tracked and logged from an original version of the map to a current version of the map.

Figure 5:
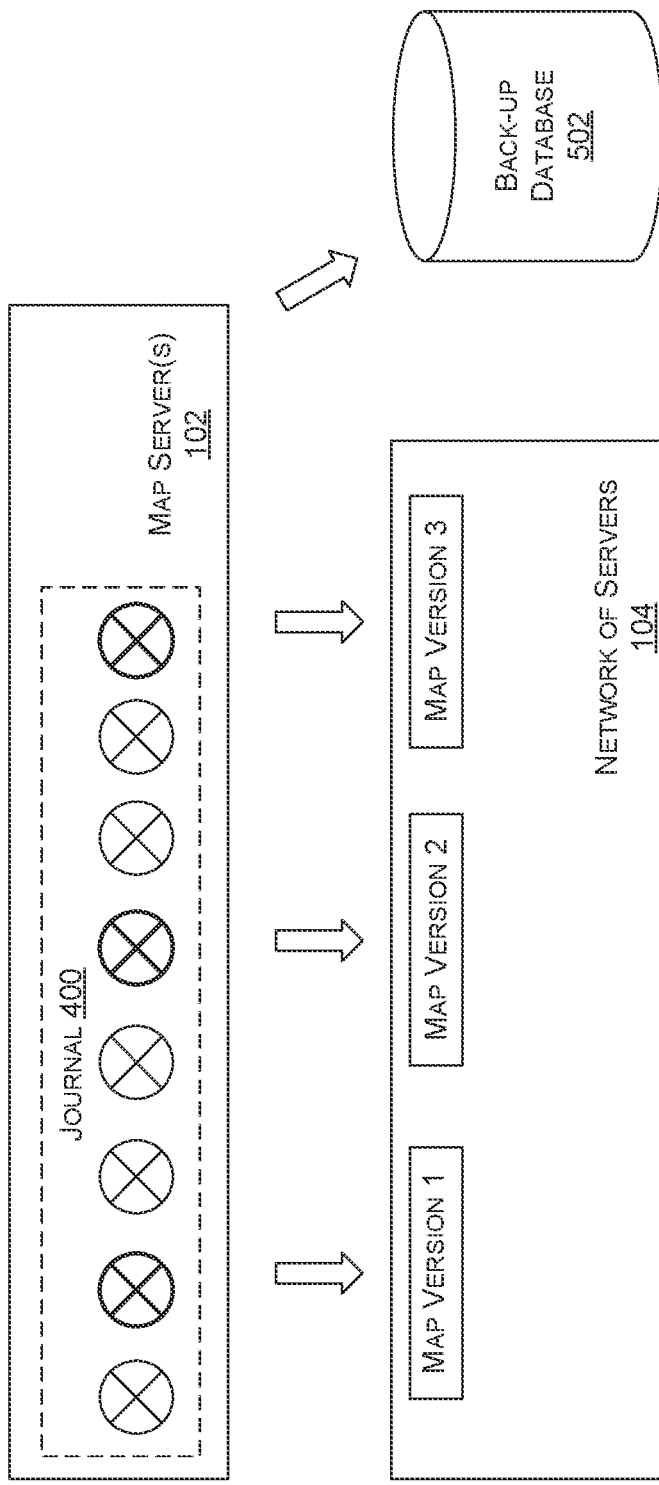
FIG. 5 is a diagram showing how the journal of FIG. 4 may interact with the network of servers of FIG. 1A, in accordance with some embodiments of the present disclosure.

FIG. 5 is a diagram showing how the journal 400 of FIG. 4 may interact with the network of servers 104 of FIG. 1A, in accordance with some embodiments of the present disclosure. Over time, new snapshots of map data may be stored in the journal 400 of a map server 102. Upon reaching or a determination of any of various conditions (non-limiting examples may include the elapse of a pre-determined or regular period of time, when sufficient data for a major update has been collected, when a critical change has been detected), a new map version may be published to the network of servers 104. The journal 400 may also be stored in a back-up database 502 to ensure retention of the various older versions of the map data. By storing the different modifications as pointers that reference the older versions of the map data, as shown in FIG. 3, any snapshot of a version of the map may be recreated and/or accessed. Versions of the map data may be referenced by the network of servers 104 based at least upon a snapshot of the journal 400, which may be created periodically, upon a major update, or upon some other criteria. A snapshot may include creating all the new structure and updating the live maps database to include this new version as usable by customers. Any map snapshot or state in time can be created by finding the nearest previous snapshot and then applying each change in turn to create the requested state. This immutable design allows for personal "branches" of the live dataset for performing various experiments or test development.

The method 150, at block B162, includes receiving a request or other message from a vehicle. The computer system of the vehicle may request certain map data, such as a new tile based upon a geographic location, new layers of existing tiles, periodic map updates, and the like. The request may include information indicative of the current map version on the vehicle, sensors on the vehicle, existing layers utilized, etc. The request may include a URI(s) corresponding to at least one node of map data.

The method 150, at block B164, includes identifying a map version for the vehicle and identifying which map data is needed to fulfill the request regarding the map version. The map version may be included in the message from the vehicle, stored on one or more servers of the network of servers, or may be indicated by other information in the message or previous interactions with the vehicle. The vehicle may be operating using one of the map versions from the network of servers 104, such as the first version or the second version. Based upon the version control and item tracking, knowing the current map version for the vehicle means that the server(s) fulfilling a request and/or pushing data may know exactly what map data is on the vehicle and by extension what map data is needed without unnecessary or duplicative data transfer.

The method 150, at block B166, includes identifying a set of data for the vehicle, which may include map data and/or nodes associated with pointers and/or references provided by the vehicle using a map manifest. The set of data may be retrieved and/or identified using the URI(s) in the message(s) from the vehicle. Map data (e.g., of nodes) may be identified, packaged, and/or encoded for the vehicle. The method 150, at block B168, includes transmitting the set of data to the vehicle. Transmitting the set of data may be performed by a content delivery network hosted by the network of servers 104, as shown in FIG. 1A. The vehicle may then implement the map data. The vehicle may continue operating on previous map data during the transfer and installation of the new map data. The vehicle may then perform various navigation- and control-related functions of the vehicle, such as those discussed herein, based upon the new map data once the new map data is installed.

Figure 6:
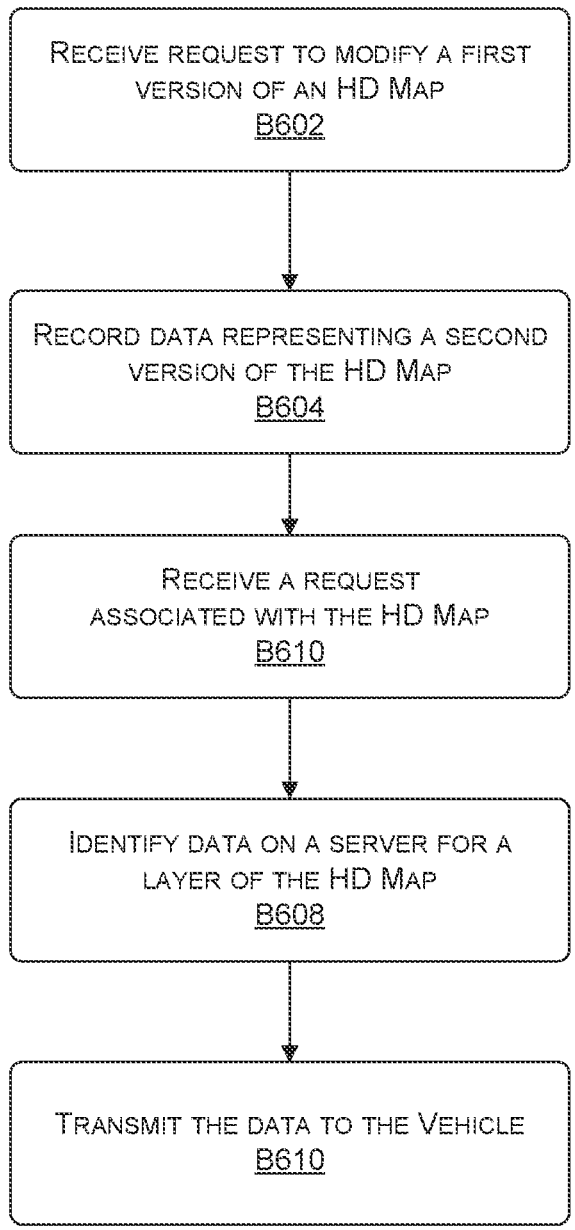
FIG. 6 is a flow diagram showing a method for updating and serving HD map data, in accordance with some embodiments of the present disclosure.

Now referring to FIG. 6, each block of method 600, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 600 is described, by way of example, with respect to the map data system 100 of FIG. 1A. However, these methods may additionally or alternatively be executed by any one system, or any combination of systems, including, but not limited to, those described herein.

FIG. 6 is a flow diagram showing a method 600 for modifying and serving map data to a vehicle, in accordance with some embodiments of the present disclosure. The method 600, at block B602, includes receiving a request to modify a first version of a High definition (HD) map. The first version of the HD map may be defined by a first connected graph of a set of nodes stored on the network of servers 104, the set of nodes encoding layers 206 of map content in association with geographical locations. A first node of the set of nodes (e.g., as in FIG. 3) may represent a first layer grouping a first set of segments of the map content in association with a geographical region and a second node of the set of nodes may represent a second layer grouping a second set of segments of the map content in association with the geographical region. A first node of the set of nodes may additionally or alternatively represent a first layer of a first type of sensor data in association with a geographical region and a second node of the set of nodes may represent a second layer of a second type of sensor data in association with the geographical region. The layers of map content may comprise one or more of: lane boundary information; lane marking information; traffic sign information; RADAR information; LiDAR information; or road segment information.

The method 600, at block B604 includes, based at least on the request, recording first data that represents a second version of the HD map defined by a second connected graph of the set of nodes stored on the network of servers 104, the second connected graph corresponding to the first connected graph modified according to the first request. The first request may be to add at least one node to the first connected graph and the recording the first data adds the at least one node to the set of nodes stored on the network of servers 104. The first connected graph and the second connected graph may each be immutable on the network of servers 104. The recording the first data may comprise creating one or more entries in a changelog, the one or more entries defining the second version of the map by sequences of changes to the first version of the map.

The method 600, at block B606, includes receiving, from a vehicle, a request associated with the HD map. The request may include a URI(s) corresponding to the at least one node, and the network of servers 104 may retrieve the second data using the URI.

The method 600, at block B608, includes identifying, based at least on the second request and on at least one server of the network of servers 104, second data representative of at least a portion of a layer of the layers of map content. The identifying the second data may be from a snapshot of the changelog.

The method 600, at block B610, includes transmitting, by the network of servers 104, the second data representative of the at least the portion of the layer to the vehicle. The transmitting of the second data may be performed at least partially using a content delivery network of the network of servers 104.

Figure 7:
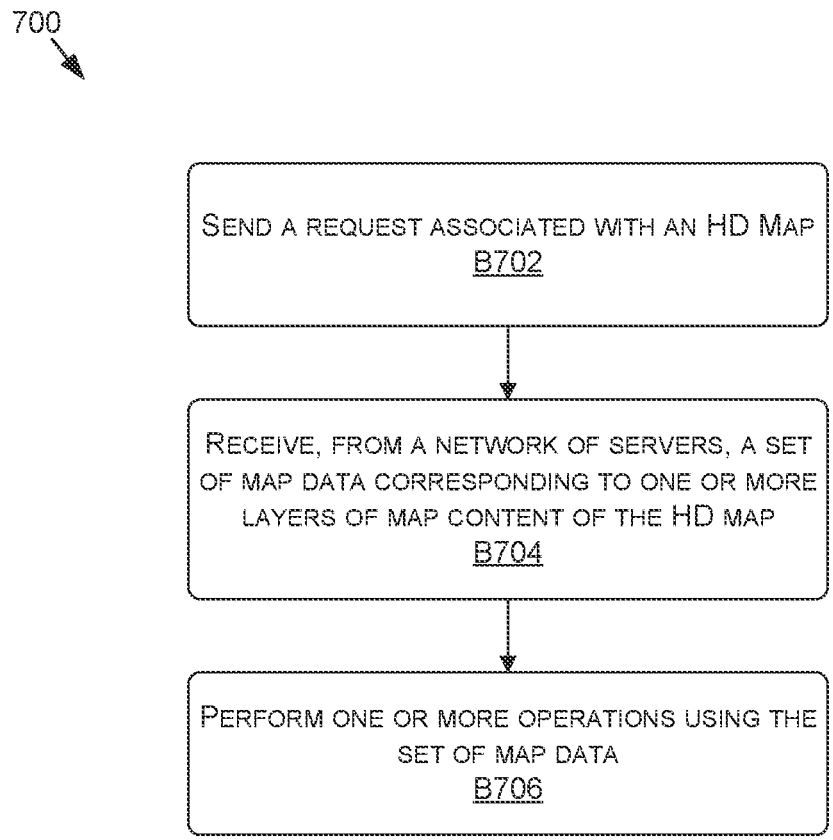
FIG. 7 is a flow diagram showing a method for updating HD map data at a vehicle and using the updated map data to control a vehicle, in accordance with some embodiments of the present disclosure.

Now referring to FIG. 7, each block of method 700, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 700 is described, by way of example, with respect to the map data system of FIG. 1A. However, these methods may additionally or alternatively be executed by any one system, or any combination of systems, including, but not limited to, those described herein.

FIG. 7 is a flow diagram showing a method 700 for updating HD map data at a vehicle and using the updated HD map data to control a vehicle, in accordance with some embodiments of the present disclosure. The method 700, at block B702, includes sending, to a server 108C in a network of servers 104, a request 114 associated with an HD map stored on the network of servers 104. The server 108C of the network of servers 104 may retrieve a corresponding set of map data in a map data message(s) 116 using, for example, one or more URIs included in the request.

The method 700, at block B704, includes receiving, from the network of servers 104, the set of map data corresponding to at least a portion of a layer of layers of map content of the HD map.

The method 700, at block B706, includes performing one or more operations using the set of map data.

The methods 600 and/or 700 may be performed at least partially by or in association with one or more processors that are comprised in at least one of a control system for an autonomous or semi-autonomous machine, a perception system for an autonomous or semi-autonomous machine, a system for performing simulation operations, a system for performing deep learning operations, a system implemented using an edge device, a system implemented using a robot, a system incorporating one or more virtual machines (VMs), a system implemented at least partially in a data center, or a system implemented at least partially using cloud computing resources.

Example Autonomous Vehicle

Figure 8A:
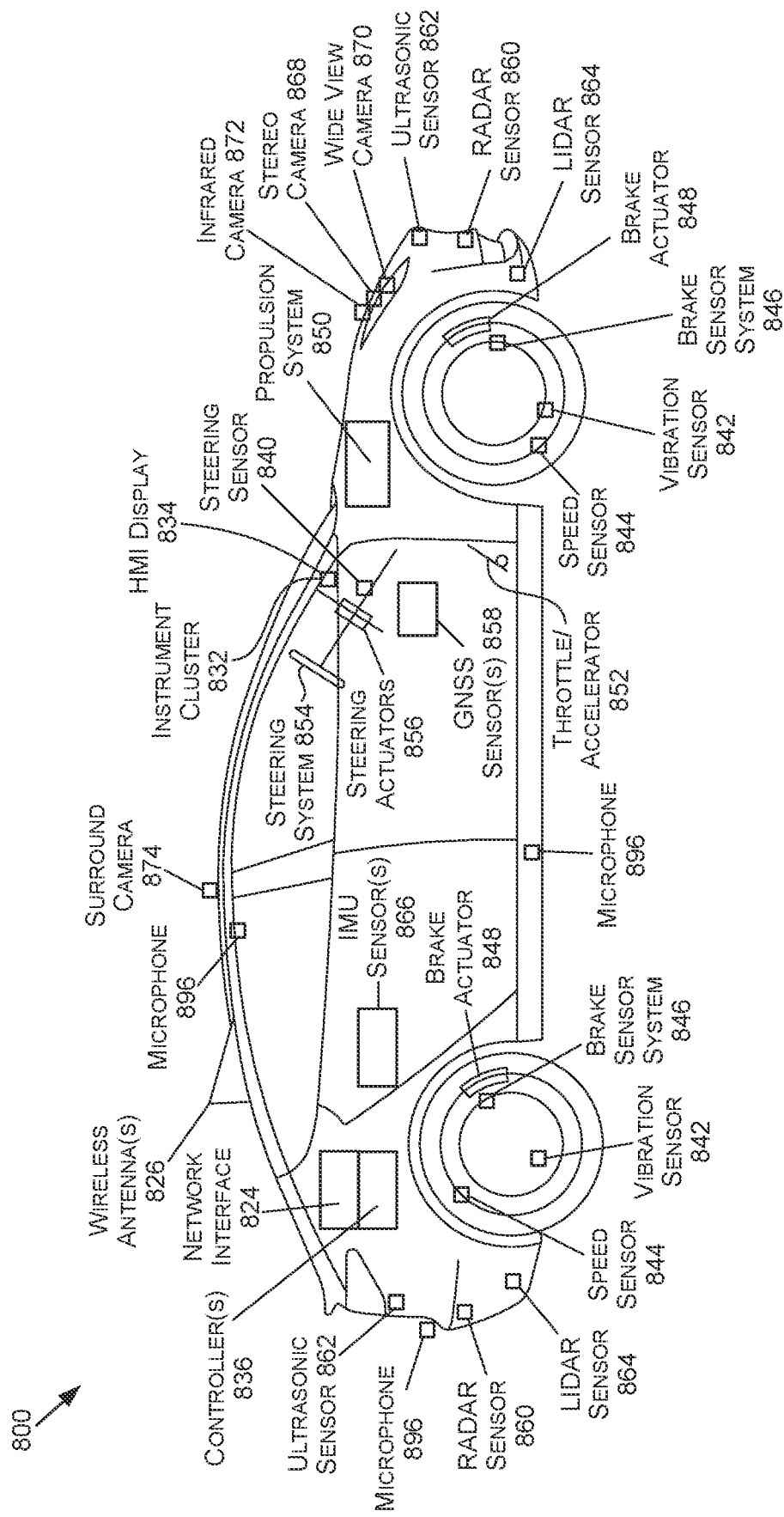
FIG. 8A is an illustration of an example autonomous vehicle, in accordance with some embodiments of the present disclosure.

FIG. 8A is an illustration of an example autonomous vehicle 800, in accordance with some embodiments of the present disclosure. The autonomous vehicle 800 (alternatively referred to herein as the "vehicle 800") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, a vehicle coupled to a trailer, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 800 may be capable of functionality in accordance with one or more of Level 3-Level 5 of the autonomous driving levels. The vehicle 800 may be capable of functionality in accordance with one or more of Level 1-Level 5 of the autonomous driving levels. For example, the vehicle 800 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 800 or other machine, such as being fully autonomous, being highly autonomous, being conditionally autonomous, being partially autonomous, providing assistive autonomy, being semi-autonomous, being primarily autonomous, or other designation.

The vehicle 800 may include components such as a chassis, a vehicle body, wheels (e.g., 2, 4, 6, 8, 18, etc.), tires, axles, and other components of a vehicle. The vehicle 800 may include a propulsion system 850, such as an internal combustion engine, hybrid electric power plant, an all-electric engine, and/or another propulsion system type. The propulsion system 850 may be connected to a drive train of the vehicle 800, which may include a transmission, to enable the propulsion of the vehicle 800. The propulsion system 850 may be controlled in response to receiving signals from the throttle/accelerator 852.

A steering system 854, which may include a steering wheel, may be used to steer the vehicle 800 (e.g., along a desired path or route) when the propulsion system 850 is operating (e.g., when the vehicle is in motion). The steering system 854 may receive signals from a steering actuator 856. The steering wheel may be optional for full automation (Level 5) functionality.

The brake sensor system 846 may be used to operate the vehicle brakes in response to receiving signals from the brake actuators 848 and/or brake sensors.

Controller(s) 836, which may include one or more system on chips (SoCs) 804 (FIG. 8C) and/or GPU(s), may provide signals (e.g., representative of commands) to one or more components and/or systems of the vehicle 800. For example, the controller(s) may send signals to operate the vehicle brakes via one or more brake actuators 848, to operate the steering system 854 via one or more steering actuators 856, to operate the propulsion system 850 via one or more throttle/accelerators 852. The controller(s) 836 may include one or more onboard (e.g., integrated) computing devices (e.g., supercomputers) that process sensor signals, and output operation commands (e.g., signals representing commands) to enable autonomous driving and/or to assist a human driver in driving the vehicle 800. The controller(s) 836 may include a first controller 836 for autonomous driving functions, a second controller 836 for functional safety functions, a third controller 836 for artificial intelligence functionality (e.g., computer vision), a fourth controller 836 for infotainment functionality, a fifth controller 836 for redundancy in emergency conditions, and/or other controllers. In some examples, a single controller 836 may handle two or more of the above functionalities, two or more controllers 836 may handle a single functionality, and/or any combination thereof.

The controller(s) 836 may provide the signals for controlling one or more components and/or systems of the vehicle 800 in response to sensor data received from one or more sensors (e.g., sensor inputs). The sensor data may be received from, for example and without limitation, global navigation satellite systems sensor(s) 858 (e.g., Global Positioning System sensor(s)), RADAR sensor(s) 860, ultrasonic sensor(s) 862, LIDAR sensor(s) 864, inertial measurement unit (IMU) sensor(s) 866 (e.g., accelerometer(s), gyroscope(s), magnetic compass(es), magnetometer(s), etc.), microphone(s) 896, stereo camera(s) 868, wide-view camera(s) 870 (e.g., fisheye cameras), infrared camera(s) 872, surround camera(s) 874 (e.g., 360 degree cameras), long-range and/or mid-range camera(s) 898, speed sensor(s) 844 (e.g., for measuring the speed of the vehicle 800), vibration sensor(s) 842, steering sensor(s) 840, brake sensor(s) (e.g., as part of the brake sensor system 846), and/or other sensor types.

One or more of the controller(s) 836 may receive inputs (e.g., represented by input data) from an instrument cluster 832 of the vehicle 800 and provide outputs (e.g., represented by output data, display data, etc.) via a human-machine interface (HMI) display 834, an audible annunciator, a loudspeaker, and/or via other components of the vehicle 800. The outputs may include information such as vehicle velocity, speed, time, map data (e.g., the HD map 822 of FIG. 8C), location data (e.g., the vehicle's 800 location, such as on a map), direction, location of other vehicles (e.g., an occupancy grid), information about objects and status of objects as perceived by the controller(s) 836, etc. For example, the HMI display 834 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 800 further includes a network interface 824 which may use one or more wireless antenna(s) 826 and/or modem(s) to communicate over one or more networks. For example, the network interface 824 may be capable of communication over LTE, WCDMA, UMTS, GSM, CDMA2000, etc. The wireless antenna(s) 826 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 8B:
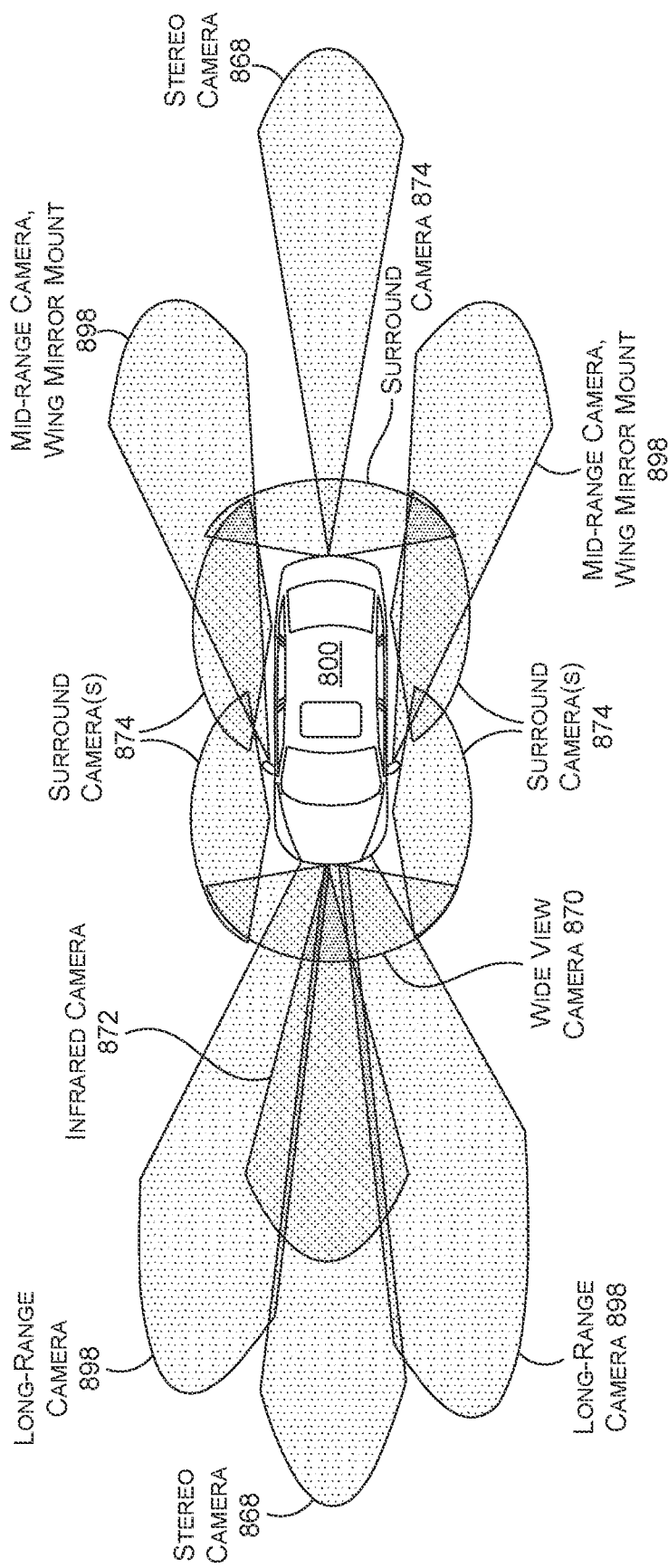
FIG. 8B is an example of camera locations and fields of view for the example autonomous vehicle of FIG. 8A, in accordance with some embodiments of the present disclosure.

FIG. 8B is an example of camera locations and fields of view for the example autonomous vehicle 800 of FIG. 8A, in accordance with some embodiments of the present disclosure. The cameras and respective fields of view are one example embodiment and are not intended to be limiting. For example, additional and/or alternative cameras may be included and/or the cameras may be located at different locations on the vehicle 800.

The camera types for the cameras may include, but are not limited to, digital cameras that may be adapted for use with the components and/or systems of the vehicle 800. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 800 (e.g., front-facing cameras) may be used for surround view, to help identify forward facing paths and obstacles, as well aid in, with the help of one or more controllers 836 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 870 that may be used to perceive objects coming into view from the periphery (e.g., pedestrians, crossing traffic or bicycles). Although only one wide-view camera is illustrated in FIG. 8B, there may any number of wide-view cameras 870 on the vehicle 800. In addition, long-range camera(s) 898 (e.g., a long-view stereo camera pair) may be used for depth-based object detection, especially for objects for which a neural network has not yet been trained. The long-range camera(s) 898 may also be used for object detection and classification, as well as basic object tracking.

One or more stereo cameras 868 may also be included in a front-facing configuration. The stereo camera(s) 868 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 868 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 868 may be used in addition to, or alternatively from, those described herein.

Cameras with a field of view that include portions of the environment to the side of the vehicle 800 (e.g., side-view cameras) may be used for surround view, providing information used to create and update the occupancy grid, as well as to generate side impact collision warnings. For example, surround camera(s) 874 (e.g., four surround cameras 874 as illustrated in FIG. 8B) may be positioned to on the vehicle 800. The surround camera(s) 874 may include wide-view camera(s) 870, fisheye camera(s), 360 degree camera(s), and/or the like. Four example, four fisheye cameras may be positioned on the vehicle's front, rear, and sides. In an alternative arrangement, the vehicle may use three surround camera(s) 874 (e.g., left, right, and rear), and may leverage one or more other camera(s) (e.g., a forward-facing camera) as a fourth surround view camera.

Cameras with a field of view that include portions of the environment to the rear of the vehicle 800 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 898, stereo camera(s) 868), infrared camera(s) 872, etc.), as described herein.

Figure 8C:
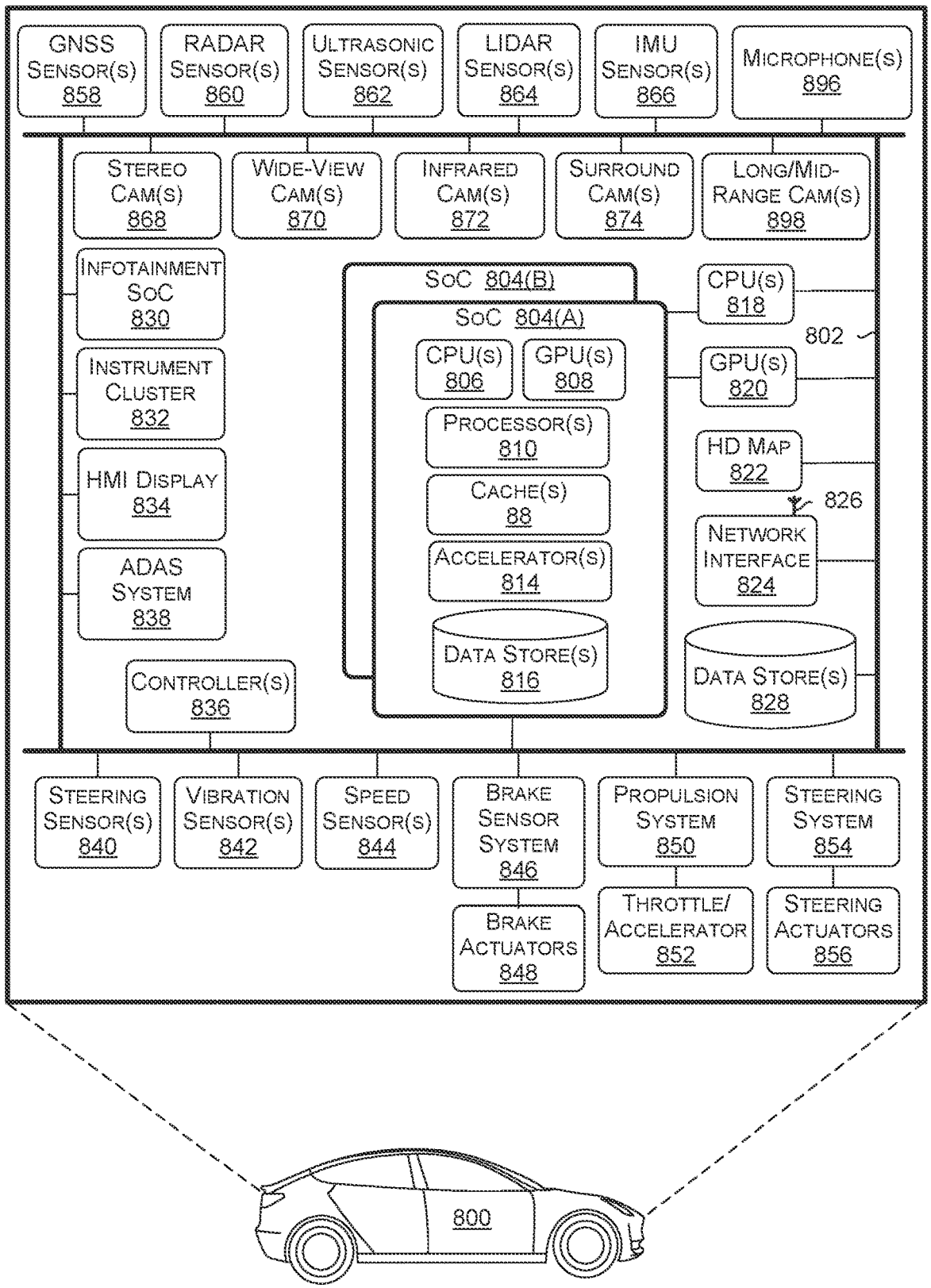
FIG. 8C is a block diagram of an example system architecture for the example autonomous vehicle of FIG. 8A, in accordance with some embodiments of the present disclosure.

FIG. 8C is a block diagram of an example system architecture for the example autonomous vehicle 800 of FIG. 8A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 800 in FIG. 8C are illustrated as being connected via bus 802. The bus 802 may include a Controller Area Network (CAN) data interface (alternatively referred to herein as a "CAN bus"). A CAN may be a network inside the vehicle 800 used to aid in control of various features and functionality of the vehicle 800, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 802 is described herein as being a CAN bus, this is not intended to be limiting. For example, in addition to, or alternatively from, the CAN bus, FlexRay and/or Ethernet may be used. Additionally, although a single line is used to represent the bus 802, this is not intended to be limiting. For example, there may be any number of busses 802, which may include one or more CAN busses, one or more FlexRay busses, one or more Ethernet busses, and/or one or more other types of busses using a different protocol. In some examples, two or more busses 802 may be used to perform different functions, and/or may be used for redundancy. For example, a first bus 802 may be used for collision avoidance functionality and a second bus 802 may be used for actuation control. In any example, each bus 802 may communicate with any of the components of the vehicle 800, and two or more busses 802 may communicate with the same components. In some examples, each SoC 804, each controller 836, and/or each computer within the vehicle may have access to the same input data (e.g., inputs from sensors of the vehicle 800), and may be connected to a common bus, such the CAN bus.

The vehicle 800 may include one or more controller(s) 836, such as those described herein with respect to FIG. 8A. The controller(s) 836 may be used for a variety of functions. The controller(s) 836 may be coupled to any of the various other components and systems of the vehicle 800, and may be used for control of the vehicle 800, artificial intelligence of the vehicle 800, infotainment for the vehicle 800, and/or the like.

The vehicle 800 may include a system(s) on a chip (SoC) 804. The SoC 804 may include CPU(s) 806, GPU(s) 808, processor(s) 810, cache(s) 812, accelerator(s) 814, data store(s) 816, and/or other components and features not illustrated. The SoC(s) 804 may be used to control the vehicle 800 in a variety of platforms and systems. For example, the SoC(s) 804 may be combined in a system (e.g., the system of the vehicle 800) with an HD map 822 which may obtain map refreshes and/or updates via a network interface 824 from one or more servers (e.g., server(s) 878 of FIG. 8D).

The CPU(s) 806 may include a CPU cluster or CPU complex (alternatively referred to herein as a "CCPLEX"). The CPU(s) 806 may include multiple cores and/or L2 caches. For example, in some embodiments, the CPU(s) 806 may include eight cores in a coherent multi-processor configuration. In some embodiments, the CPU(s) 806 may include four dual-core clusters where each cluster has a dedicated L2 cache (e.g., a 2 MB L2 cache). The CPU(s) 806 (e.g., the CCPLEX) may be configured to support simultaneous cluster operation enabling any combination of the clusters of the CPU(s) 806 to be active at any given time. The CPU(s) 806 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 806 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 808 may include an integrated GPU (alternatively referred to herein as an "iGPU"). The GPU(s) 808 may be programmable and may be efficient for parallel workloads. The GPU(s) 808, in some examples, may use an enhanced tensor instruction set. The GPU(s) 808 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 808 may include at least eight streaming microprocessors. The GPU(s) 808 may use compute application programming interface(s) (API(s)). In addition, the GPU(s) 808 may use one or more parallel computing platforms and/or programming models (e.g., NVIDIA's CUDA).

The GPU(s) 808 may be power-optimized for best performance in automotive and embedded use cases. For example, the GPU(s) 808 may be fabricated on a Fin field-effect transistor (FinFET). However, this is not intended to be limiting and the GPU(s) 808 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 808 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 808 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 808 to access the CPU(s) 806 page tables directly. In such examples, when the GPU(s) 808 memory management unit (MMU) experiences a miss, an address translation request may be transmitted to the CPU(s) 806. In response, the CPU(s) 806 may look in its page tables for the virtual-to-physical mapping for the address and transmits the translation back to the GPU(s) 808. As such, unified memory technology may allow a single unified virtual address space for memory of both the CPU(s) 806 and the GPU(s) 808, thereby simplifying the GPU(s) 808 programming and porting of applications to the GPU(s) 808.

In addition, the GPU(s) 808 may include an access counter that may keep track of the frequency of access of the GPU(s) 808 to memory of other processors. The access counter may help ensure that memory pages are moved to the physical memory of the processor that is accessing the pages most frequently.

The SoC(s) 804 may include any number of cache(s) 812, including those described herein. For example, the cache(s) 812 may include an L3 cache that is available to both the CPU(s) 806 and the GPU(s) 808 (e.g., that is connected both the CPU(s) 806 and the GPU(s) 808). The cache(s) 812 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 804 may include an arithmetic logic unit(s) (ALU(s)) which may be leveraged in performing processing with respect to any of the variety of tasks or operations of the vehicle 800—such as processing DNNs. In addition, the SoC(s) 804 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 806 and/or GPU(s) 808.

The SoC(s) 804 may include one or more accelerators 814 (e.g., hardware accelerators, software accelerators, or a combination thereof). For example, the SoC(s) 804 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 808 and to off-load some of the tasks of the GPU(s) 808 (e.g., to free up more cycles of the GPU(s) 808 for performing other tasks). As an example, the accelerator(s) 814 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 814 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 808, and by using an inference accelerator, for example, a designer may target either the DLA(s) or the GPU(s) 808 for any function. For example, the designer may focus processing of CNNs and floating point operations on the DLA(s) and leave other functions to the GPU(s) 808 and/or other accelerator(s) 814.

The accelerator(s) 814 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 806. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 814 (e.g., the hardware acceleration cluster) may include a computer vision network on-chip and SRAM, for providing a high-bandwidth, low latency SRAM for the accelerator(s) 814. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 804 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 814 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 866 output that correlates with the vehicle 800 orientation, distance, 3D location estimates of the object obtained from the neural network and/or other sensors (e.g., LIDAR sensor(s) 864 or RADAR sensor(s) 860), among others.

The SoC(s) 804 may include data store(s) 816 (e.g., memory). The data store(s) 816 may be on-chip memory of the SoC(s) 804, which may store neural networks to be executed on the GPU and/or the DLA. In some examples, the data store(s) 816 may be large enough in capacity to store multiple instances of neural networks for redundancy and safety. The data store(s) 812 may comprise L2 or L3 cache(s) 812. Reference to the data store(s) 816 may include reference to the memory associated with the PVA, DLA, and/or other accelerator(s) 814, as described herein.

The SoC(s) 804 may include one or more processor(s) 810 (e.g., embedded processors). The processor(s) 810 may include a boot and power management processor that may be a dedicated processor and subsystem to handle boot power and management functions and related security enforcement. The boot and power management processor may be a part of the SoC(s) 804 boot sequence and may provide runtime power management services. The boot power and management processor may provide clock and voltage programming, assistance in system low power state transitions, management of SoC(s) 804 thermals and temperature sensors, and/or management of the SoC(s) 804 power states. Each temperature sensor may be implemented as a ring-oscillator whose output frequency is proportional to temperature, and the SoC(s) 804 may use the ring-oscillators to detect temperatures of the CPU(s) 806, GPU(s) 808, and/or accelerator(s) 814. If temperatures are determined to exceed a threshold, the boot and power management processor may enter a temperature fault routine and put the SoC(s) 804 into a lower power state and/or put the vehicle 800 into a chauffeur to safe stop mode (e.g., bring the vehicle 800 to a safe stop).

The processor(s) 810 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 810 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 810 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 810 may further include a real-time camera engine that may include a dedicated processor subsystem for handling real-time camera management.

The processor(s) 810 may further include a high-dynamic range signal processor that may include an image signal processor that is a hardware engine that is part of the camera processing pipeline.

The processor(s) 810 may include a video image compositor that may be a processing block (e.g., implemented on a microprocessor) that implements video post-processing functions needed by a video playback application to produce the final image for the player window. The video image compositor may perform lens distortion correction on wide-view camera(s) 870, surround camera(s) 874, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 808 is not required to continuously render new surfaces. Even when the GPU(s) 808 is powered on and active doing 3D rendering, the video image compositor may be used to offload the GPU(s) 808 to improve performance and responsiveness.

The SoC(s) 804 may further include a mobile industry processor interface (MIPI) camera serial interface for receiving video and input from cameras, a high-speed interface, and/or a video input block that may be used for camera and related pixel input functions. The SoC(s) 804 may further include an input/output controller(s) that may be controlled by software and may be used for receiving I/O signals that are uncommitted to a specific role.

The SoC(s) 804 may further include a broad range of peripheral interfaces to enable communication with peripherals, audio codecs, power management, and/or other devices. The SoC(s) 804 may be used to process data from cameras (e.g., connected over Gigabit Multimedia Serial Link and Ethernet), sensors (e.g., LIDAR sensor(s) 864, RADAR sensor(s) 860, etc. that may be connected over Ethernet), data from bus 802 (e.g., speed of vehicle 800, steering wheel position, etc.), data from GNSS sensor(s) 858 (e.g., connected over Ethernet or CAN bus). The SoC(s) 804 may further include dedicated high-performance mass storage controllers that may include their own DMA engines, and that may be used to free the CPU(s) 806 from routine data management tasks.

The SoC(s) 804 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 804 may be faster, more reliable, and even more energy-efficient and space-efficient than conventional systems. For example, the accelerator(s) 814, when combined with the CPU(s) 806, the GPU(s) 808, and the data store(s) 816, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 820) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 808.

In some examples, a CNN for facial recognition and vehicle owner identification may use data from camera sensors to identify the presence of an authorized driver and/or owner of the vehicle 800. The always on sensor processing engine may be used to unlock the vehicle when the owner approaches the driver door and turn on the lights, and, in security mode, to disable the vehicle when the owner leaves the vehicle. In this way, the SoC(s) 804 provide for security against theft and/or carjacking.

In another example, a CNN for emergency vehicle detection and identification may use data from microphones 896 to detect and identify emergency vehicle sirens. In contrast to conventional systems, that use general classifiers to detect sirens and manually extract features, the SoC(s) 804 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 858. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 862, until the emergency vehicle(s) passes.

The vehicle may include a CPU(s) 818 (e.g., discrete CPU(s), or dCPU(s)), that may be coupled to the SoC(s) 804 via a high-speed interconnect (e.g., PCIe). The CPU(s) 818 may include an X86 processor, for example. The CPU(s) 818 may be used to perform any of a variety of functions, including arbitrating potentially inconsistent results between ADAS sensors and the SoC(s) 804, and/or monitoring the status and health of the controller(s) 836 and/or infotainment SoC 830, for example.

The vehicle 800 may include a GPU(s) 820 (e.g., discrete GPU(s), or dGPU(s)), that may be coupled to the SoC(s) 804 via a high-speed interconnect (e.g., NVIDIA's NVLINK). The GPU(s) 820 may provide additional artificial intelligence functionality, such as by executing redundant and/or different neural networks, and may be used to train and/or update neural networks based on input (e.g., sensor data) from sensors of the vehicle 800.

The vehicle 800 may further include the network interface 824 which may include one or more wireless antennas 826 (e.g., one or more wireless antennas for different communication protocols, such as a cellular antenna, a Bluetooth antenna, etc.). The network interface 824 may be used to enable wireless connectivity over the Internet with the cloud (e.g., with the server(s) 878 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 800 information about vehicles in proximity to the vehicle 800 (e.g., vehicles in front of, on the side of, and/or behind the vehicle 800). This functionality may be part of a cooperative adaptive cruise control functionality of the vehicle 800.

The network interface 824 may include a SoC that provides modulation and demodulation functionality and enables the controller(s) 836 to communicate over wireless networks. The network interface 824 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 800 may further include data store(s) 828 which may include off-chip (e.g., off the SoC(s) 804) storage. The data store(s) 828 may include one or more storage elements including RAM, SRAM, DRAM, VRAM, Flash, hard disks, and/or other components and/or devices that may store at least one bit of data.

The vehicle 800 may further include GNSS sensor(s) 858. The GNSS sensor(s) 858 (e.g., GPS, assisted GPS sensors, differential GPS (DGPS) sensors, etc.), to assist in mapping, perception, occupancy grid generation, and/or path planning functions. Any number of GNSS sensor(s) 858 may be used, including, for example and without limitation, a GPS using a USB connector with an Ethernet to Serial (RS-232) bridge.

The vehicle 800 may further include RADAR sensor(s) 860. The RADAR sensor(s) 860 may be used by the vehicle 800 for long-range vehicle detection, even in darkness and/or severe weather conditions. RADAR functional safety levels may be ASIL B. The RADAR sensor(s) 860 may use the CAN and/or the bus 802 (e.g., to transmit data generated by the RADAR sensor(s) 860) for control and to access object tracking data, with access to Ethernet to access raw data in some examples. A wide variety of RADAR sensor types may be used. For example, and without limitation, the RADAR sensor(s) 860 may be suitable for front, rear, and side RADAR use. In some example, Pulse Doppler RADAR sensor(s) are used.

The RADAR sensor(s) 860 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 860 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 800 surroundings at higher speeds with minimal interference from traffic in adjacent lanes. The other two antennae may expand the field of view, making it possible to quickly detect vehicles entering or leaving the vehicle's 800 lane.

Mid-range RADAR systems may include, as an example, a range of up to 860 m (front) or 80 m (rear), and a field of view of up to 42 degrees (front) or 850 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 800 may further include ultrasonic sensor(s) 862. The ultrasonic sensor(s) 862, which may be positioned at the front, back, and/or the sides of the vehicle 800, may be used for park assist and/or to create and update an occupancy grid. A wide variety of ultrasonic sensor(s) 862 may be used, and different ultrasonic sensor(s) 862 may be used for different ranges of detection (e.g., 2.5 m, 4 m). The ultrasonic sensor(s) 862 may operate at functional safety levels of ASIL B.

The vehicle 800 may include LIDAR sensor(s) 864. The LIDAR sensor(s) 864 may be used for object and pedestrian detection, emergency braking, collision avoidance, and/or other functions. The LIDAR sensor(s) 864 may be functional safety level ASIL B. In some examples, the vehicle 800 may include multiple LIDAR sensors 864 (e.g., two, four, six, etc.) that may use Ethernet (e.g., to provide data to a Gigabit Ethernet switch).

In some examples, the LIDAR sensor(s) 864 may be capable of providing a list of objects and their distances for a 360-degree field of view. Commercially available LIDAR sensor(s) 864 may have an advertised range of approximately 800 m, with an accuracy of 2 cm-3 cm, and with support for a 800 Mbps Ethernet connection, for example. In some examples, one or more non-protruding LIDAR sensors 864 may be used. In such examples, the LIDAR sensor(s) 864 may be implemented as a small device that may be embedded into the front, rear, sides, and/or corners of the vehicle 800. The LIDAR sensor(s) 864, in such examples, may provide up to a 120-degree horizontal and 35-degree vertical field-of-view, with a 200 m range even for low-reflectivity objects. Front-mounted LIDAR sensor(s) 864 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 800. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 864 may be less susceptible to motion blur, vibration, and/or shock.

The vehicle may further include IMU sensor(s) 866. The IMU sensor(s) 866 may be located at a center of the rear axle of the vehicle 800, in some examples. The IMU sensor(s) 866 may include, for example and without limitation, an accelerometer(s), a magnetometer(s), a gyroscope(s), a magnetic compass(es), and/or other sensor types. In some examples, such as in six-axis applications, the IMU sensor(s) 866 may include accelerometers and gyroscopes, while in nine-axis applications, the IMU sensor(s) 866 may include accelerometers, gyroscopes, and magnetometers.

In some embodiments, the IMU sensor(s) 866 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 866 may enable the vehicle 800 to estimate heading without requiring input from a magnetic sensor by directly observing and correlating the changes in velocity from GPS to the IMU sensor(s) 866. In some examples, the IMU sensor(s) 866 and the GNSS sensor(s) 858 may be combined in a single integrated unit.

The vehicle may include microphone(s) 896 placed in and/or around the vehicle 800. The microphone(s) 896 may be used for emergency vehicle detection and identification, among other things.

The vehicle may further include any number of camera types, including stereo camera(s) 868, wide-view camera(s) 870, infrared camera(s) 872, surround camera(s) 874, long-range and/or mid-range camera(s) 898, and/or other camera types. The cameras may be used to capture image data around an entire periphery of the vehicle 800. The types of cameras used depends on the embodiments and requirements for the vehicle 800, and any combination of camera types may be used to provide the necessary coverage around the vehicle 800. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 8A and FIG. 8B.

The vehicle 800 may further include vibration sensor(s) 842. The vibration sensor(s) 842 may measure vibrations of components of the vehicle, such as the axle(s). For example, changes in vibrations may indicate a change in road surfaces. In another example, when two or more vibration sensors 842 are used, the differences between the vibrations may be used to determine friction or slippage of the road surface (e.g., when the difference in vibration is between a power-driven axle and a freely rotating axle).

The vehicle 800 may include an ADAS system 838. The ADAS system 838 may include a SoC, in some examples. The ADAS system 838 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 860, LIDAR sensor(s) 864, and/or a camera(s). The ACC systems may include longitudinal ACC and/or lateral ACC. Longitudinal ACC monitors and controls the distance to the vehicle immediately ahead of the vehicle 800 and automatically adjust the vehicle speed to maintain a safe distance from vehicles ahead. Lateral ACC performs distance keeping, and advises the vehicle 800 to change lanes when necessary. Lateral ACC is related to other ADAS applications such as LCA and CWS.

CACC uses information from other vehicles that may be received via the network interface 824 and/or the wireless antenna(s) 826 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 800), while the I2V communication concept provides information about traffic further ahead. CACC systems may include either or both I2V and V2V information sources. Given the information of the vehicles ahead of the vehicle 800, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 860, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 860, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 800 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 800 if the vehicle 800 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 860, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 800 is backing up. Some RCTW systems include AEB to ensure that the vehicle brakes are applied to avoid a crash. RCTW systems may use one or more rear-facing RADAR sensor(s) 860, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 800, the vehicle 800 itself must, in the case of conflicting results, decide whether to heed the result from a primary computer or a secondary computer (e.g., a first controller 836 or a second controller 836). For example, in some embodiments, the ADAS system 838 may be a backup and/or secondary computer for providing perception information to a backup computer rationality module. The backup computer rationality monitor may run a redundant diverse software on hardware components to detect faults in perception and dynamic driving tasks. Outputs from the ADAS system 838 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 804.

In other examples, ADAS system 838 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 838 may be fed into the primary computer's perception block and/or the primary computer's dynamic driving task block. For example, if the ADAS system 838 indicates a forward crash warning due to an object immediately ahead, the perception block may use this information when identifying objects. In other examples, the secondary computer may have its own neural network which is trained and thus reduces the risk of false positives, as described herein.

The vehicle 800 may further include the infotainment SoC 830 (e.g., an in-vehicle infotainment system (IVI)). Although illustrated and described as a SoC, the infotainment system may not be a SoC, and may include two or more discrete components. The infotainment SoC 830 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 800. For example, the infotainment SoC 830 may radios, disk players, navigation systems, video players, USB and Bluetooth connectivity, carputers, in-car entertainment, Wi-Fi, steering wheel audio controls, hands free voice control, a heads-up display (HUD), an HMI display 834, a telematics device, a control panel (e.g., for controlling and/or interacting with various components, features, and/or systems), and/or other components. The infotainment SoC 830 may further be used to provide information (e.g., visual and/or audible) to a user(s) of the vehicle, such as information from the ADAS system 838, autonomous driving information such as planned vehicle maneuvers, trajectories, surrounding environment information (e.g., intersection information, vehicle information, road information, etc.), and/or other information.

The infotainment SoC 830 may include GPU functionality. The infotainment SoC 830 may communicate over the bus 802 (e.g., CAN bus, Ethernet, etc.) with other devices, systems, and/or components of the vehicle 800. In some examples, the infotainment SoC 830 may be coupled to a supervisory MCU such that the GPU of the infotainment system may perform some self-driving functions in the event that the primary controller(s) 836 (e.g., the primary and/or backup computers of the vehicle 800) fail. In such an example, the infotainment SoC 830 may put the vehicle 800 into a chauffeur to safe stop mode, as described herein.

The vehicle 800 may further include an instrument cluster 832 (e.g., a digital dash, an electronic instrument cluster, a digital instrument panel, etc.). The instrument cluster 832 may include a controller and/or supercomputer (e.g., a discrete controller or supercomputer). The instrument cluster 832 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 830 and the instrument cluster 832. In other words, the instrument cluster 832 may be included as part of the infotainment SoC 830, or vice versa.

Figure 8D:
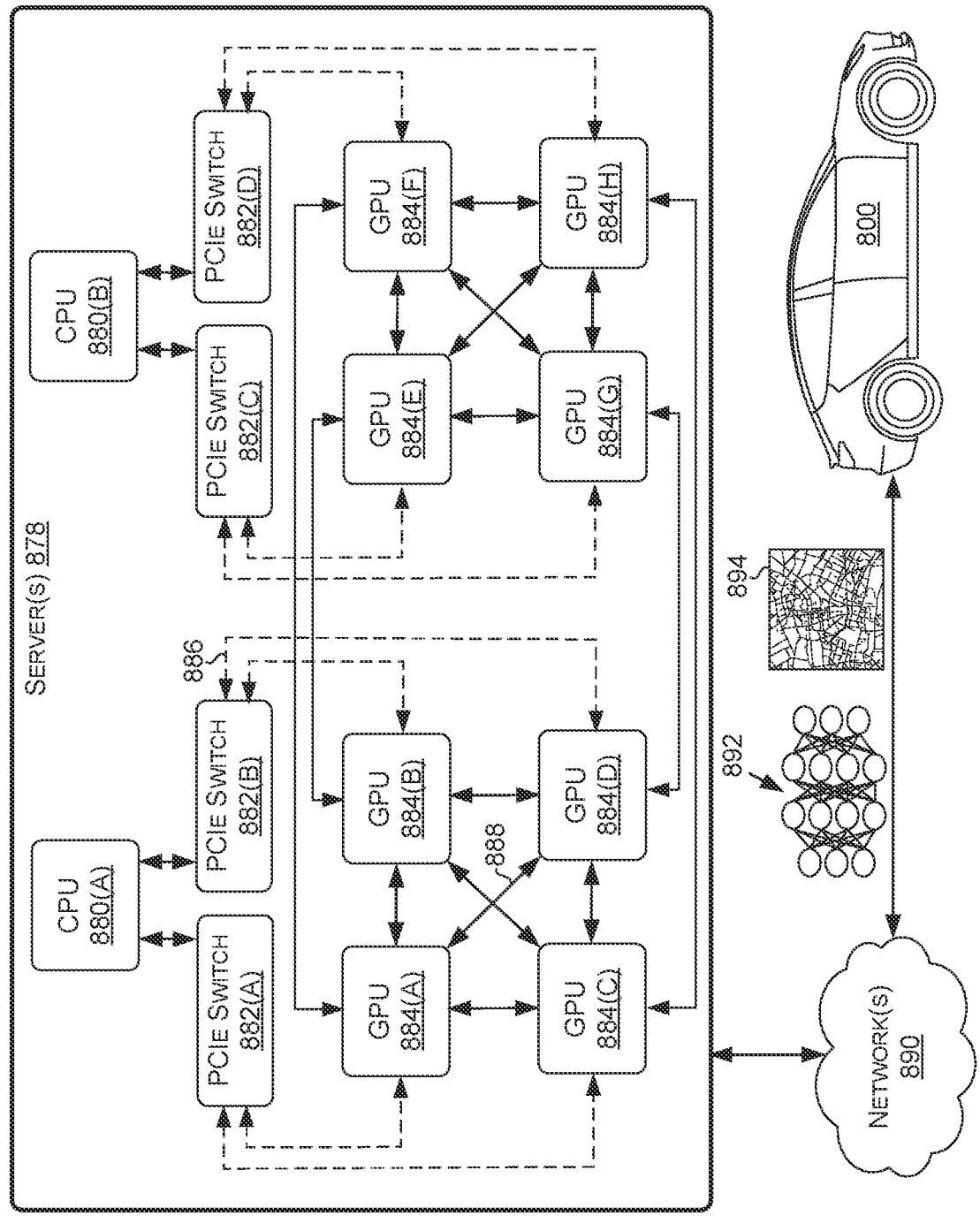
FIG. 8D is a system diagram for communication between cloud-based server(s) and the example autonomous vehicle of FIG. 8A, in accordance with some embodiments of the present disclosure.

FIG. 8D is a system diagram for communication between cloud-based server(s) and the example autonomous vehicle 800 of FIG. 8A, in accordance with some embodiments of the present disclosure. The system 876 may include server(s) 878, network(s) 890, and vehicles, including the vehicle 800. The server(s) 878 may include a plurality of GPUs 884(A)-884(H) (collectively referred to herein as GPUs 884), PCIe switches 882(A)-882(H) (collectively referred to herein as PCIe switches 882), and/or CPUs 880(A)-880(B) (collectively referred to herein as CPUs 880). The GPUs 884, the CPUs 880, and the PCIe switches may be interconnected with high-speed interconnects such as, for example and without limitation, NVLink interfaces 888 developed by NVIDIA and/or PCIe connections 886. In some examples, the GPUs 884 are connected via NVLink and/or NVSwitch SoC and the GPUs 884 and the PCIe switches 882 are connected via PCIe interconnects. Although eight GPUs 884, two CPUs 880, and two PCIe switches are illustrated, this is not intended to be limiting. Depending on the embodiment, each of the server(s) 878 may include any number of GPUs 884, CPUs 880, and/or PCIe switches. For example, the server(s) 878 may each include eight, sixteen, thirty-two, and/or more GPUs 884.

The server(s) 878 may receive, over the network(s) 890 and from the vehicles, image data representative of images showing unexpected or changed road conditions, such as recently commenced road-work. The server(s) 878 may transmit, over the network(s) 890 and to the vehicles, neural networks 892, updated neural networks 892, and/or map information 894, including information regarding traffic and road conditions. The updates to the map information 894 may include updates for the HD map 822, such as information regarding construction sites, potholes, detours, flooding, and/or other obstructions. In some examples, the neural networks 892, the updated neural networks 892, and/or the map information 894 may have resulted from new training and/or experiences represented in data received from any number of vehicles in the environment, and/or based on training performed at a datacenter (e.g., using the server(s) 878 and/or other servers).

The server(s) 878 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 890, and/or the machine learning models may be used by the server(s) 878 to remotely monitor the vehicles.

In some examples, the server(s) 878 may receive data from the vehicles and apply the data to up-to-date real-time neural networks for real-time intelligent inferencing. The server(s) 878 may include deep-learning supercomputers and/or dedicated AI computers powered by GPU(s) 884, such as a DGX and DGX Station machines developed by NVIDIA. However, in some examples, the server(s) 878 may include deep learning infrastructure that use only CPU-powered datacenters.

The deep-learning infrastructure of the server(s) 878 may be capable of fast, real-time inferencing, and may use that capability to evaluate and verify the health of the processors, software, and/or associated hardware in the vehicle 800. For example, the deep-learning infrastructure may receive periodic updates from the vehicle 800, such as a sequence of images and/or objects that the vehicle 800 has located in that sequence of images (e.g., via computer vision and/or other machine learning object classification techniques). The deep-learning infrastructure may run its own neural network to identify the objects and compare them with the objects identified by the vehicle 800 and, if the results do not match and the infrastructure concludes that the AI in the vehicle 800 is malfunctioning, the server(s) 878 may transmit a signal to the vehicle 800 instructing a fail-safe computer of the vehicle 800 to assume control, notify the passengers, and complete a safe parking maneuver.

For inferencing, the server(s) 878 may include the GPU(s) 884 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 9:
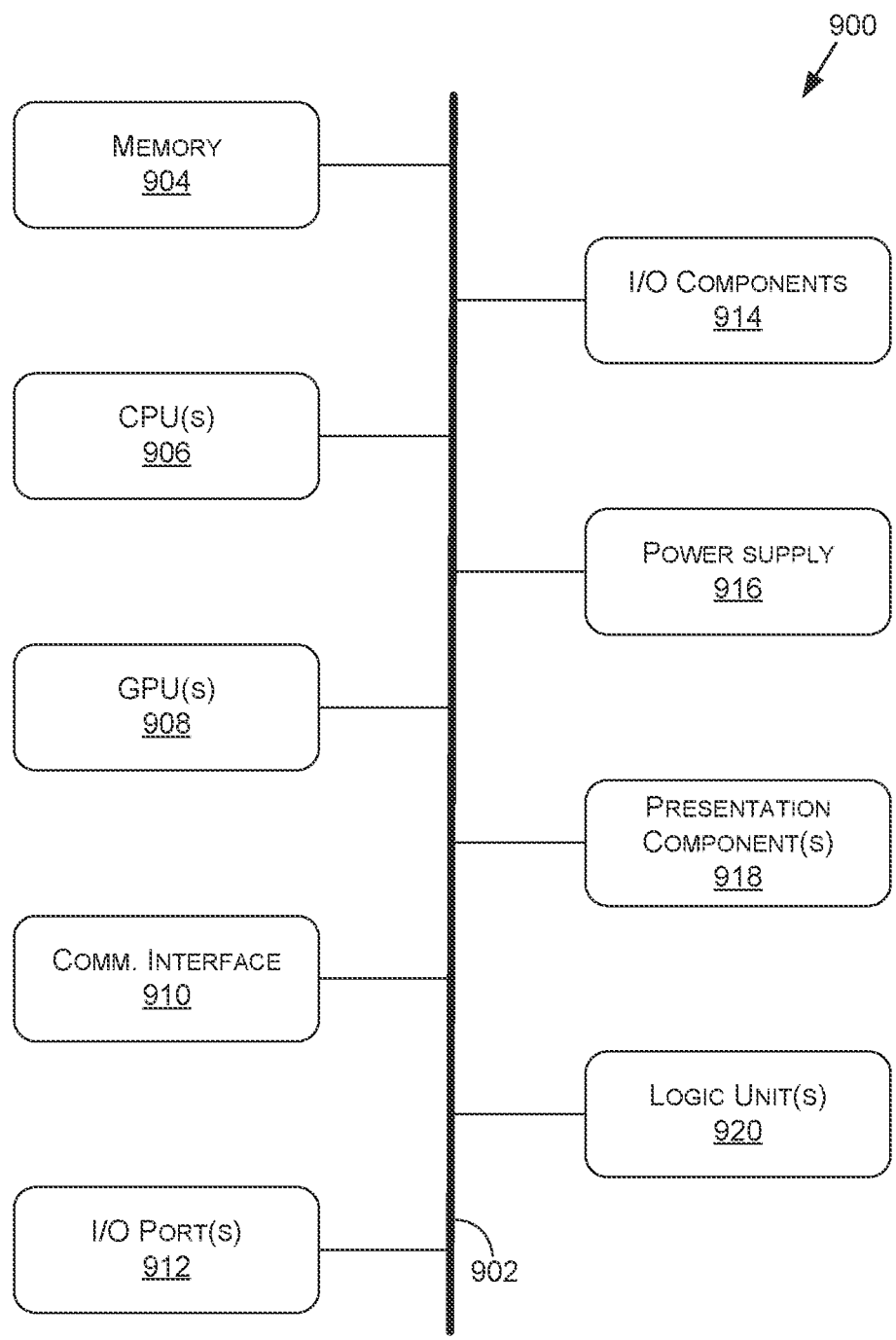
FIG. 9 is a block diagram of an example computing device suitable for use in implementing some embodiments of the present disclosure.

FIG. 9 is a block diagram of an example computing device(s) 900 suitable for use in implementing some embodiments of the present disclosure. Computing device 900 may include an interconnect system 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, one or more presentation components 918 (e.g., display(s)), and one or more logic units 920. In at least one embodiment, the computing device(s) 900 may comprise one or more virtual machines (VMs), and/or any of the components thereof may comprise virtual components (e.g., virtual hardware components). For non-limiting examples, one or more of the GPUs 908 may comprise one or more vGPUs, one or more of the CPUs 906 may comprise one or more vCPUs, and/or one or more of the logic units 920 may comprise one or more virtual logic units. As such, a computing device(s) 900 may include discrete components (e.g., a full GPU dedicated to the computing device 900), virtual components (e.g., a portion of a GPU dedicated to the computing device 900), or a combination thereof.

Although the various blocks of FIG. 9 are shown as connected via the interconnect system 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 9.

The interconnect system 902 may represent one or more links or busses, such as an address bus, a data bus, a control bus, or a combination thereof. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 906 may be directly connected to the memory 904. Further, the CPU 906 may be directly connected to the GPU 908. Where there is direct, or point-to-point connection between components, the interconnect system 902 may include a PCIe link to carry out the connection. In these examples, a PCI bus need not be included in the computing device 900.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 906 may be configured to execute at least some of the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908.

Examples of the logic unit(s) 920 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 910 may include one or more receivers, transmitters, and/or transceivers that enable the computing device 900 to communicate with other computing devices via an electronic communication network, included wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 920 and/or communication interface 910 may include one or more data processing units (DPUs) to transmit data received over a network and/or through interconnect system 902 directly to (e.g., a memory of) one or more GPU(s) 908.

The I/O ports 912 may enable the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, DPUs, etc.), and output the data (e.g., as an image, video, sound, etc.).

Example Data Center

Figure 10:
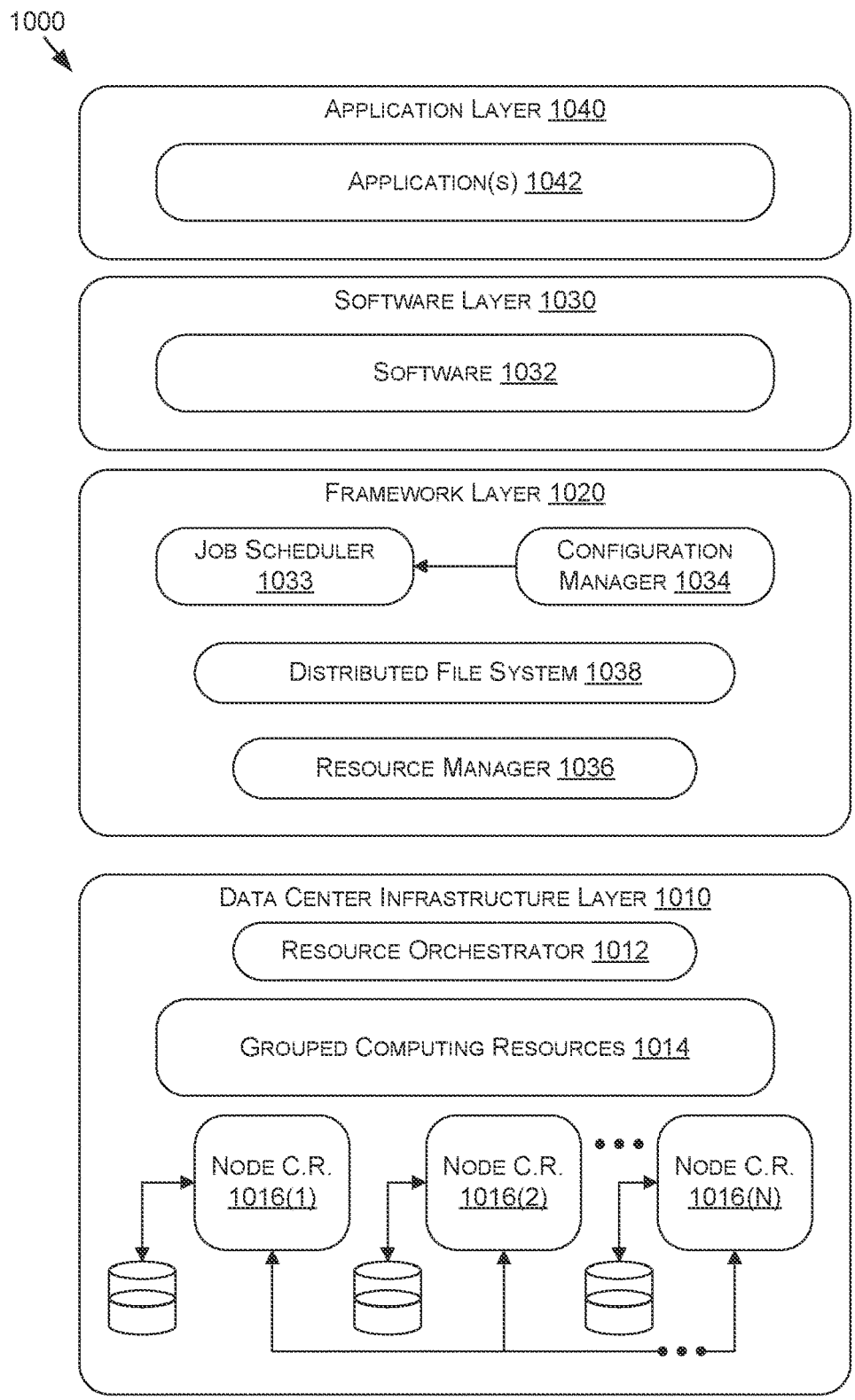
FIG. 10 is a block diagram of an example data center suitable for use in implementing some embodiments of the present disclosure.

FIG. 10 illustrates an example data center 1000 that may be used in at least one embodiments of the present disclosure. The data center 1000 may include a data center infrastructure layer 1010, a framework layer 1020, a software layer 1030, and/or an application layer 1040.

As shown in FIG. 10, the data center infrastructure layer 1010 may include a resource orchestrator 1012, grouped computing resources 1014, and node computing resources ("node C.R.s") 1016(1)-1016(N), where "N" represents any whole, positive integer. In at least one embodiment, node C.R.s 1016(I)-1016(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1016(1)-1016(N) may correspond to a server having one or more of the above-mentioned computing resources. In addition, in some embodiments, the node C.R.s 1016(1)-10161(N) may include one or more virtual components, such as vGPUs, vCPUs, and/or the like, and/or one or more of the node C.R.s 1016(1)-1016(N) may correspond to a virtual machine (VM).

In at least one embodiment, grouped computing resources 1014 may include separate groupings of node C.R.s 1016 housed within one or more racks (not shown), or many racks housed in data centers at various geographical locations (also not shown). Separate groupings of node C.R.s 1016 within grouped computing resources 1014 may include grouped compute, network, memory or storage resources that may be configured or allocated to support one or more workloads. In at least one embodiment, several node C.R.s 1016 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1012 may configure or otherwise control one or more node C.R.s 1016(1)-1016(N) and/or grouped computing resources 1014. In at least one embodiment, resource orchestrator 1012 may include a software design infrastructure (SDI) management entity for the data center 1000. The resource orchestrator 1012 may include hardware, software, or some combination thereof.

In at least one embodiment, as shown in FIG. 10, framework layer 1020 may include a job scheduler 1033, a configuration manager 1034, a resource manager 1036, and/or a distributed file system 1038. The framework layer 1020 may include a framework to support software 1032 of software layer 1030 and/or one or more application(s) 1042 of application layer 1040. The software 1032 or application(s) 1042 may respectively include web-based service software or applications, such as those provided by Amazon Web Services, Google Cloud and Microsoft Azure. The framework layer 1020 may be, but is not limited to, a type of free and open-source software web application framework such as Apache Spark™ (hereinafter "Spark") that may utilize distributed file system 1038 for large-scale data processing (e.g., "big data"). In at least one embodiment, job scheduler 1033 may include a Spark driver to facilitate scheduling of workloads supported by various layers of data center 1000. The configuration manager 1034 may be capable of configuring different layers such as software layer 1030 and framework layer 1020 including Spark and distributed file system 1038 for supporting large-scale data processing. The resource manager 1036 may be capable of managing clustered or grouped computing resources mapped to or allocated for support of distributed file system 1038 and job scheduler 1033. In at least one embodiment, clustered or grouped computing resources may include grouped computing resource 1014 at data center infrastructure layer 1010. The resource manager 1036 may coordinate with resource orchestrator 1012 to manage these mapped or allocated computing resources.

In at least one embodiment, software 1032 included in software layer 1030 may include software used by at least portions of node C.R.s 1016(1)-1016(N), grouped computing resources 1014, and/or distributed file system 1038 of framework layer 1020. One or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016(1)-1016(N), grouped computing resources 1014, and/or distributed file system 1038 of framework layer 1020. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1034, resource manager 1036, and resource orchestrator 1012 may implement any number and type of self-modifying actions based on any amount and type of data acquired in any technically feasible fashion. Self-modifying actions may relieve a data center operator of data center 1000 from making possibly bad configuration decisions and possibly avoiding underutilized and/or poor performing portions of a data center.

The data center 1000 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1000. In at least one embodiment, trained or deployed machine learning models corresponding to one or more neural networks may be used to infer or predict information using resources described above with respect to the data center 1000 by using weight parameters calculated through one or more training techniques, such as but not limited to those described herein.

In at least one embodiment, the data center 1000 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 900 of FIG. 9—e.g., each device may include similar components, features, and/or functionality of the computing device(s) 900. In addition, where backend devices (e.g., servers, NAS, etc.) are implemented, the backend devices may be included as part of a data center 1000, an example of which is described in more detail herein with respect to FIG. 10.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 900 described herein with respect to FIG. 9. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A computer implemented method comprising:
   generating a first version of a high definition (HD) map defined using a first graph that connects nodes of encoded map content, an individual node of the nodes corresponding to a respective geographic region of geographic regions of an environment encoded by the first version of the HD map, the first version of the HD map including:
      a first reference to a new node, the new node corresponding to a modification to at least one of a same tile or a same layer with respect to a first existing node corresponding to a second graph that defines a second version of the HD map, the first existing node being connected to one or more second existing nodes of the second graph; and
      one or more second references that associate the new node with the one or more second existing nodes corresponding to the second graph; and
   sending at least a portion of the map content encoded using one or more of the nodes to a machine.

2. The computer implemented method of claim 1, wherein the sending of the at least the portion of the map content is performed using a content delivery network.

3. The computer implemented method of claim 1, wherein the generating of the first version of the HD map is responsive to a request to modify the at least one of the same tile or the same layer with respect to the first existing node corresponding to the second version of the HD map.

4. The computer implemented method of claim 1, wherein at least one of the first version of the HD map or the second version of the HD map is immutable on a network of servers.

5. The computer implemented method of claim 1, wherein a first node of the nodes represents a first layer that groups a first set of segments of the map content in association with a geographical region and a second node of the nodes represents a second layer that groups a second set of segments of the map content in association with the geographical region.

6. The computer implemented method of claim 1, wherein a first node of the nodes represents a first layer of a first type of sensor data in association with a geographical region and a second node of the nodes represents a second layer of a second type of sensor data in association with the geographical region.

7. The computer implemented method of claim 1, wherein the new node corresponds to at least the modification to the same layer, and the same layer comprises one or more of:
   lane boundary information;
   lane marking information;
   traffic sign information;
   RADAR localization information;
   LiDAR localization information; or
   road segment information.

8. The computer implemented method of claim 1, wherein the generating the first version of the HD map includes creating one or more entries in a changelog, the one or more entries defining the first version of the HD map using sequences of changes to the second version of the map, wherein the at least the portion of the map content is identified for the sending from a snapshot of the changelog.

9. The computer implemented method of claim 1, wherein the sending is based at least on a request including a uniform resource identifier (URI) corresponding to the one or more of the nodes, and a network of servers retrieves the at least the portion of the map content for the sending using the URI.

10. The computer implemented method of claim 1, wherein the sending is to an autonomous machine, and the autonomous machine performs one or more control operations using the at least the portion of the map content.

11. The computer implemented method of claim 1, wherein the new node represents a tile associated with a geographical region and the one or more second existing nodes are associated with at least one of one or more layers associated with the geographic region or one or more segments associated with the geographic region.

12. The computer implemented method of claim 1, wherein the new node is associated with a geographic region of the geographic regions, the one or more second existing nodes are associated with one or more layers associated with the geographic region, and the one or more second existing nodes are connected to one or more third existing nodes that are associated with one or more segments associated with the one or more layers.

13. A system comprising:
   one or more processors to execute operations comprising:
      receiving a request to modify a first version of a map, the first version of the map being defined by a first graph that connects at least a first existing node to one or more second existing nodes, the first existing node and the one or more second existing nodes encoding one or more layers of map content in association with one or more locations of the map;
      based at least on the request, generating a second version of the map, the second version of the map being defined by a second graph that includes an updated node corresponding to the first existing node and one or more references that associate the updated node with the one or more second existing nodes from the first graph; and sending, using at least one server of a network of servers, data representative of the at least a portion of the one or more layers to a client device.

14. The system of claim 13, wherein the request is to modify the first existing node of the first graph to generate the updated node of the second graph.

15. The system of claim 13, wherein first existing node represents a first layer grouping a first set of segments of the map content in association with a geographical region and the one or more second existing nodes represent one or more second layers grouping a second set of segments of the map content in association with the geographical region.

16. The system of claim 13, wherein the one or more layers comprise one or more of:
lane boundary information;
lane marking information;
traffic sign information;
RADAR localization information;
LiDAR localization information; or
road segment information.

17. The system of claim 13, wherein the system is comprised in at least one of:
a control system for an autonomous or semi-autonomous machine;
a perception system for an autonomous or semi-autonomous machine;
a system for performing simulation operations;
a system for performing light transport simulation;
a system for performing collaborative content creation for 3D assets;
a system for performing deep learning operations;
a system implemented using an edge device;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

18. The system of claim 13, wherein the first graph does not include one or more second references to the second graph.

19. A processor comprising:
one or more circuits to:
generate a first version of a map defined by a first graph, the first graph including one or more first pointers from a first existing node of the first graph to one or more second existing nodes of the first graph, at least one of the first existing node or the one or more second existing nodes encoding one or more layers of map content in association with one or more locations;
generate a second version of the map defined by a second graph, the second graph including an updated node corresponding to the first existing node of the first graph and one or more second pointers from the updated node to the one or more second existing nodes of the first graph; and
provide the one or more layers of the map content to one or more client devices.

20. The processor of claim 19, wherein the processor is comprised in at least one of:
a control system for an autonomous or semi-autonomous machine;
a perception system for an autonomous or semi-autonomous machine;
a system for performing simulation operations;
a system for performing light transport simulation;
a system for performing collaborative content creation for 3D assets;
a system for performing deep learning operations;
a system implemented using an edge device;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

21. The processor of claim 19, wherein:
the first existing node is associated with a geographic area;
the updated node is associated with an update to the geographic area; and
the one or more second existing nodes are associated with the one or more layers of the geographic area.

* * * * *